(12) United States Patent
Jung et al.

(10) Patent No.: US 10,542,528 B2
(45) Date of Patent: Jan. 21, 2020

(54) METHOD AND APPARATUS FOR A PHYSICAL UPLINK CHANNEL IN RESOURCE BLOCKS

(71) Applicant: Motorola Mobility LLC, Chicago, IL (US)

(72) Inventors: Hyejung Jung, Palatine, IL (US); Ravikiran Nory, Buffalo Grove, IL (US); Vijay Nangia, Woodridge, IL (US); Robert Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 53 days.

(21) Appl. No.: 15/866,207

(22) Filed: Jan. 9, 2018

(65) Prior Publication Data

US 2018/0199335 A1 Jul. 12, 2018

Related U.S. Application Data

(60) Provisional application No. 62/444,193, filed on Jan. 9, 2017.

(51) Int. Cl.
*H04W 72/04* (2009.01)
*H04J 1/04* (2006.01)
(Continued)

(52) U.S. Cl.
CPC ........... *H04W 72/0413* (2013.01); *H04J 1/04* (2013.01); *H04L 1/1812* (2013.01);
(Continued)

(58) Field of Classification Search
CPC ................................................ H04W 72/0413
(Continued)

(56) References Cited

U.S. PATENT DOCUMENTS

2007/0263702 A1* 11/2007 Kwon ................... H04B 1/713
375/135
2012/0106372 A1 5/2012 Gaal et al.
(Continued)

OTHER PUBLICATIONS

Devillers, International Search Report, PCT International Application No. PCT/US2018/013012; European Patent Office, Rijswijk, dated Mar. 26, 2018.
(Continued)

*Primary Examiner* — Peter G Solinsky
(74) *Attorney, Agent, or Firm* — Loppnow & Chapa; Matthew C. Loppnow

(57) ABSTRACT

A method and apparatus provide a physical uplink channel in resource blocks. Scheduling information can be received. The scheduling information can be to transmit a first physical uplink channel within a slot. The slot can include a plurality of symbols. The slot can include the first physical uplink channel and a second physical uplink channel. The first physical uplink channel can be shorter in duration than the second physical uplink channel. One or more allocated resource blocks for the first physical uplink channel can be determined based on a sub-band group and one or more resource block groups within the sub-band group. The sub-band group can include one or more sub-bands. Each sub-band can include one or more resource block groups. Each resource block group can include one or more resource blocks. A resource block can include one or more contiguous resource elements in the frequency domain. The first physical uplink channel can be transmitted in the determined one or more allocated resource blocks in the slot.

24 Claims, 14 Drawing Sheets

(51) Int. Cl.
  *H04W 72/12* (2009.01)
  *H04L 1/18* (2006.01)
  *H04L 5/00* (2006.01)
  *H04J 11/00* (2006.01)

(52) U.S. Cl.
  CPC ....... *H04L 5/0051* (2013.01); *H04W 72/1215* (2013.01); *H04W 72/1268* (2013.01); *H04W 72/1273* (2013.01); *H04W 72/1284* (2013.01); *H04W 72/1289* (2013.01); *H04J 2011/0016* (2013.01)

(58) Field of Classification Search
  USPC .......................................................... 370/203
  See application file for complete search history.

(56) References Cited

U.S. PATENT DOCUMENTS

| | | | | |
|---|---|---|---|---|
| 2013/0094410 | A1* | 4/2013 | Yang | H04L 1/1854 370/280 |
| 2014/0036810 | A1* | 2/2014 | Harrison | H04W 72/042 370/329 |
| 2016/0183244 | A1* | 6/2016 | Papasakellariou | H04L 5/001 370/329 |
| 2016/0211950 | A1* | 7/2016 | Cheng | H04L 1/1864 |
| 2016/0226688 | A1 | 8/2016 | Kim et al. | |
| 2016/0294516 | A1 | 10/2016 | Zirwas | |
| 2017/0041103 | A1* | 2/2017 | Maattanen | H04L 1/1671 |
| 2017/0111134 | A1 | 4/2017 | Lee et al. | |
| 2017/0171879 | A1 | 6/2017 | Jiang et al. | |
| 2017/0223695 | A1* | 8/2017 | Kwak | H04W 56/0075 |
| 2017/0290008 | A1* | 10/2017 | Tooher | H04L 1/0007 |
| 2017/0303163 | A1 | 10/2017 | Sharma et al. | |
| 2017/0347268 | A1* | 11/2017 | Chen | H04W 16/02 |
| 2018/0019843 | A1* | 1/2018 | Papasakellariou | H04L 1/1822 |
| 2018/0110042 | A1* | 4/2018 | Chen | H04L 5/0055 |
| 2018/0132229 | A1* | 5/2018 | Li | H04L 1/0013 |
| 2018/0160404 | A1* | 6/2018 | Im | H04L 25/0226 |
| 2018/0249458 | A1* | 8/2018 | He | H04L 1/1607 |
| 2018/0375619 | A1* | 12/2018 | Hwang | H04B 7/26 |
| 2018/0376500 | A1* | 12/2018 | Yang | H04L 5/00 |
| 2019/0037585 | A1* | 1/2019 | Li | H04L 1/0071 |
| 2019/0110311 | A1* | 4/2019 | Falconetti | H04L 1/1854 |
| 2019/0116611 | A1* | 4/2019 | Lee | H04W 72/1278 |
| 2019/0124689 | A1* | 4/2019 | Yang | H04W 74/0808 |

OTHER PUBLICATIONS

Ericsson: "On high-level considerations 1-20 on URLLC design", 3GPP Draft; R1-1612925; On High-Level Considerations on URLLC Design, 3rd Generation Partnership Project (3GPP), Mobile Competence Centre; 650, Route Des Lucioles; F-06921 Sophia-Antipolis Cedex; FR vol. RAN WG1, No. Reno, NV, USA; Nov. 14, 2016-Nov. 18, 2016; Nov. 13, 2016 (Nov. 13, 2016).

Devillers, PCT International Application Search Report, International Application No. PCT/US2018/013013, European Patent Office, Rijswijk, NL, dated May 6, 2018.

Qualcomm Incorporated: "Uplink Control Channel Design for Shortened TTI", 3GPP Draft; R1-1611639 Uplink Control Channel Design for Shortened TTI, 3rd Generation Partnership Project (3GPP), Mobile Competence Centre , 650, Route Des Lucioles ; F-06921 Sophia-Antipolis Cedex, vol. RAN WG1, No. Reno, USA; Nov. 14, 2016-Nov. 18, 2016, Nov. 13, 2016.

NTT Docomo Inc: "sPUCCH for shortened TTI", 3GPP Draft; R1-1612695, 3rd Generation Partnership Project (3GPP), Mobile Competence Centre; 650, Route Des Lucioles ; F-06921 Sophia-Antipolis Cedex ; France, vol. RAN WG1, No. Reno, USA; Nov. 14, 2016-Nov. 18, 2016, Nov. 13, 2016.

Qualcomm Incorporated, "UL channelization in short UL duration," R1-1612073, 3GPP TSG-RAN WG1 #87, Nov. 14-18, 2016, Reno, U.S.A.

Zhang, Notice of References Cited, U.S. Appl. No. 15/866,191, U.S. Patent and Trademark Office, dated Mar. 21, 2019.

* cited by examiner

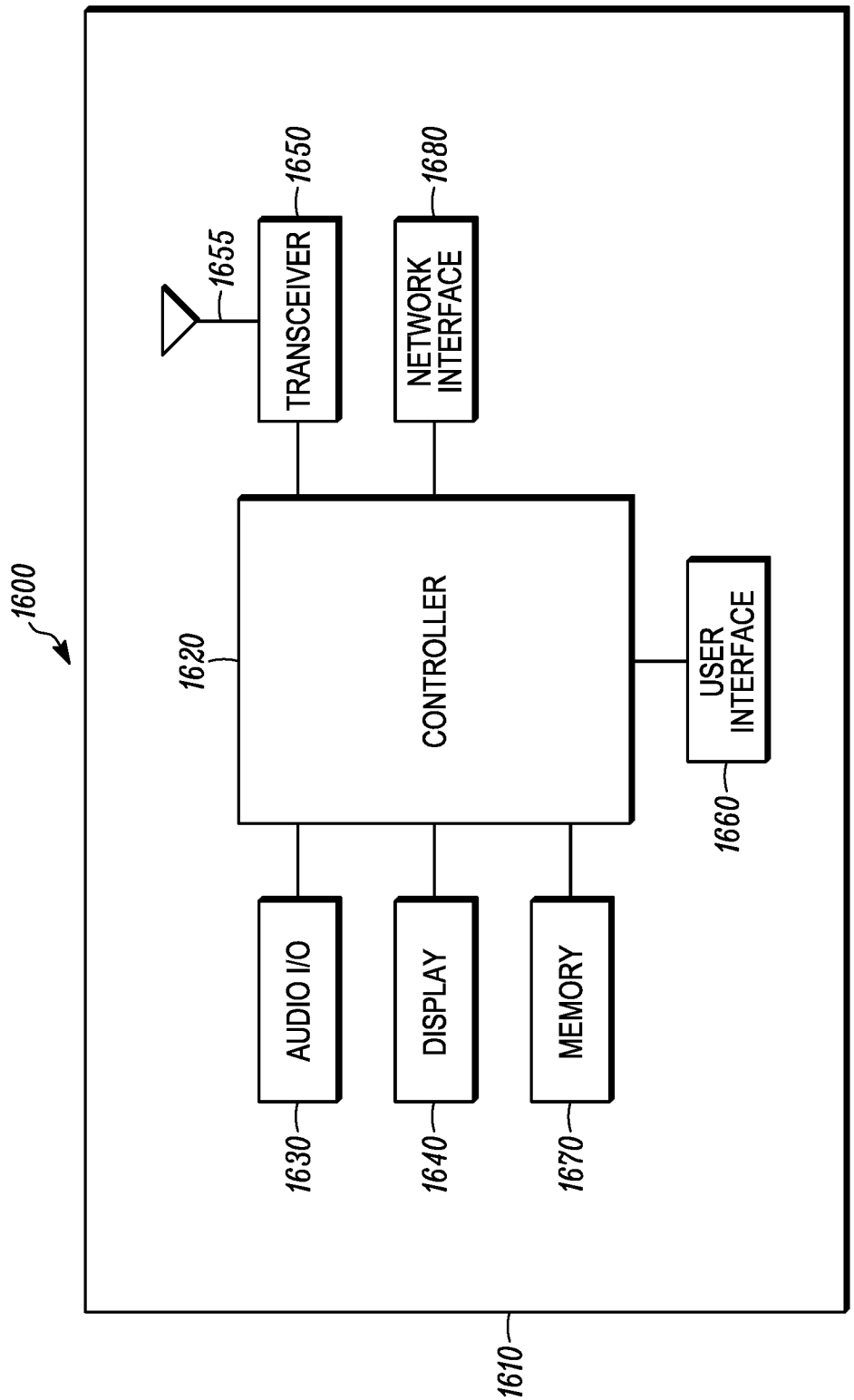

METHOD AND APPARATUS FOR A PHYSICAL UPLINK CHANNEL IN RESOURCE BLOCKS

BACKGROUND

1. Field

The present disclosure is directed to a method and apparatus for a physical uplink control channel for low-latency operation.

2. Introduction

Presently, user equipment, such as wireless communication devices, communicate with other communication devices using wireless signals. In fifth generation (5G) Radio Access Technology (RAT), a User Equipment (UE) may need to perform Downlink (DL) reception and corresponding Hybrid Automatic Repeat Request-Acknowledgement (HARQ-ACK) feedback transmission, or reception of an Uplink (UL) scheduling grant and corresponding UL transmission within a slot, in order to support low-latency communication. The slot can be a time unit including one or more symbols, such as 7 or 14 Orthogonal Frequency Division Multiplexing (OFDM), Single Carrier-Frequency Division Multiple Access (SC-FDMA), or discrete Fourier Transform-Spread-OFDM (DFT-S-OFDM) symbols.

Physical Uplink Control Channel (PUCCH) with a short duration, such as a 1 or 2 symbol duration, can be suitable for low-latency transmission of HARQ-ACK feedback. To increase the number of UEs in a cell able to use a short PUCCH, the short PUCCH can be designed to exploit a channel frequency diversity gain and to flexibly support various sizes of Uplink Control Information (UCI), such as different combinations of HARQ-ACK, Scheduling Request (SR), and limited Channel State Information (CSI). Further, scheduling flexibility for short PUCCH can minimize resource overlapping between slot-based UL data channel and short PUCCH.

For low-latency re-transmission, such as re-transmission in an immediately following slot, multiplexing of physical data and control channels in the slot can be done such that it can provide both a UE and a network entity, such as a base station, eNodeB (eNB), gNodeB (gNB), or other network entity, with enough processing time, such as for decoding and scheduling.

Larger subcarrier spacing can be employed for short PUCCH than subcarrier spacing for DL/UL data channels in order to create more short duration symbols within the reference symbol duration, such as a symbol duration of DL/UL data channel. Further, a Demodulation Reference Signal (DMRS) for short PUCCH can be transmitted in the first short symbol, while transmitting UCI content in the second short symbol. This subcarrier spacing scaling approach increases UE transmitter complexity when short PUCCH and UL data are frequency division multiplexed within a UE, since the UE has to perform Fast Fourier Transform (FFT) of two different sizes. Also, it limits scheduling flexibility of short UL control and UL data, and causes a guard band overhead due to different numerology.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 16 is an example block diagram of an apparatus according to a possible embodiment.

DETAILED DESCRIPTION

Figure 1:
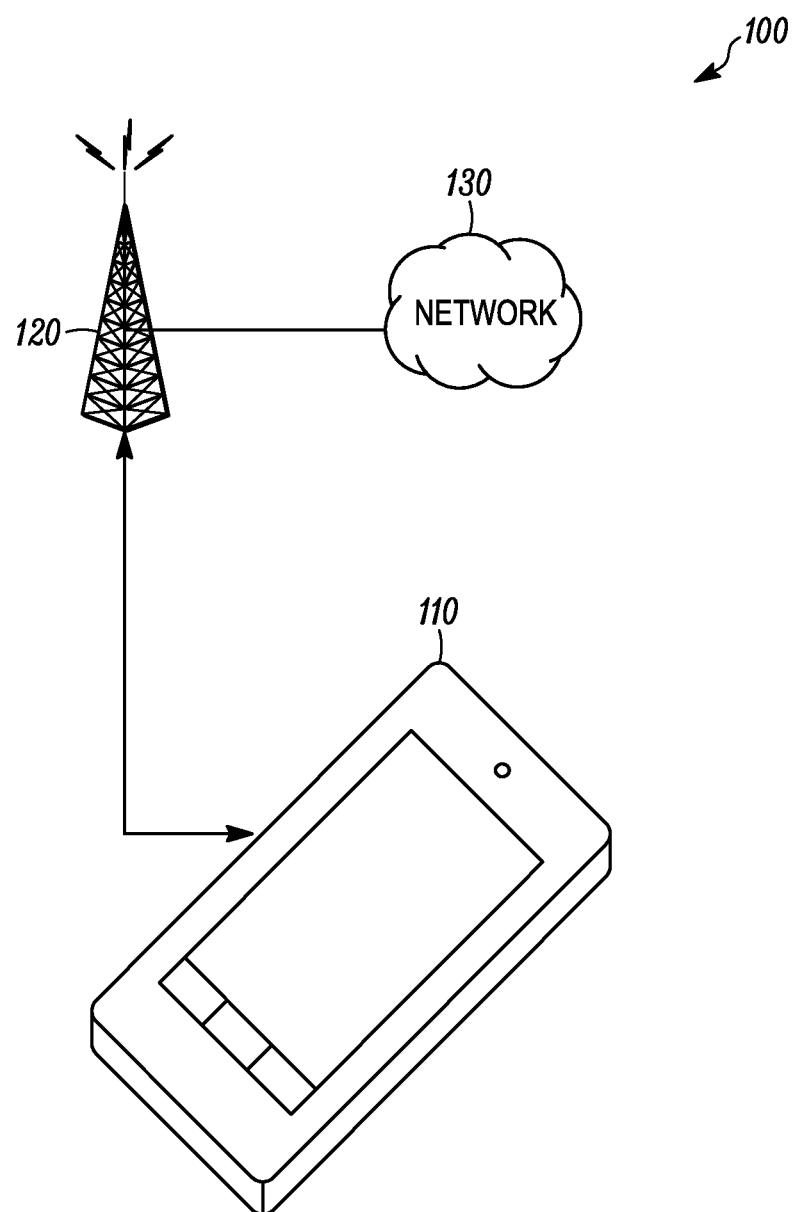
FIG. 1 is an example block diagram of a system according to a possible embodiment.

Embodiments can provide a method and apparatus for a physical uplink channel According to a possible embodiment scheduling information can be transmitted to a user equipment regarding a downlink data channel in a slot. The scheduling information can include information regarding at least a set of allocated subcarriers. The downlink data channel can require the user equipment to send an immediate hybrid automatic repeat request acknowledgement feedback within the slot. Downlink data can be transmitted using every x-th subcarrier among the allocated subcarriers in the last symbol of the downlink data channel.

According to another possible embodiment, scheduling information can be received. The scheduling information can be to transmit a first physical uplink channel within a slot. The slot can include a plurality of symbols. The slot can include the first physical uplink channel and a second physical uplink channel. The first physical uplink channel can be shorter in duration than the second physical uplink channel. One or more allocated resource blocks for the first physical uplink channel can be determined based on a sub-band group and one or more resource block groups within the sub-band group. The sub-band group can include one or more sub-bands. Each sub-band can include one or more resource block groups. Each resource block group can include one or more resource blocks. A resource block can include one or more contiguous resource elements. The first physical uplink channel can be transmitted in the one or more allocated resource blocks in the slot.

Some embodiments can provide a method to enable low-latency re-transmission and detailed designs for short PUCCH, such as channel structure, flexible resource allocation with low Downlink Control Information (DCI) signaling overhead, and multiplexing of short PUCCHs with different UCI sizes.

Compared to LTE DL type 0 or type 1 Resource Allocation (RA), embodiments can provide a short PUCCH resource allocation scheme that can use less bits to indicate RA, such as 25 bits for LTE DL type 0/1 RA vs. 10 bits for the scheme in the case of 100 Resource Block (RB) system Bandwidth (BW). Since short PUCCH can have a limited range of payload sizes, such as on/off signaling and 1~100 bits, scheduling flexibility for support of a few RB allocation sizes, such as 6 RBs and 12 RBs, can be enough, which can lead to signaling overhead reduction. And yet, the proposed RA scheme can support both frequency-selective and frequency diversity scheduling, and can accommodate wideband short PUCCH transmission which is required for unlicensed band operation.

In order to support a short PUCCH and/or a short UL data channel of 1 symbol based on the same subcarrier spacing as slot-based DL/UL data channels, a UE can employ an OFDM waveform and Frequency Division Multiplexing (FDM) of UCI and DMRS in a short PUCCH. As low-latency operation and transmission in short PUCCH mainly target UEs with good coverage and/or small propagation delay, OFDM can be used instead of DFT-S-OFDM.

FIG. 1 is an example block diagram of a system 100 according to a possible embodiment. The system 100 can include a wireless communication device 110, such as a User Equipment (UE), a base station 120, such as an enhanced NodeB (eNB) or fifth generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks. The network 130 can include various network entities (not shown).

According to a possible embodiment, a Network Entity (NE), such as the base station 120 or other entity on the network 130, can transmit DL data by using every x-th, such as x=2, subcarrier among allocated subcarriers for the last symbol of a DL data channel, if the DL data channel in a slot requires a UE to send immediate HARQ-ACK feedback on the same slot. Mapping data into every x-th subcarrier can result in x-times repetition of time-domain samples within the last OFDM symbol duration of the DL data channel. When receiving the last symbol of the DL data channel, the UE can receive only first part of time-domain samples out of multiple repeated samples. The UE can demodulate, combine the multiple repeated samples, and decode the data channel by employing FFT with possibly reduced FFT size, such as a size reduced by a factor of x. Since the UE receiving time for the last symbol of the data channel can be reduced, the remaining time can be exploited for UE processing time, such as for decoding DL data and preparation of HARQ-ACK feedback transmission.

Some embodiments can create a time budget for UE processing from the DL region in a UE-specific manner, without increasing UE Tx/Rx complexity. The value x can be set by the network, dependent on UE capability. Furthermore, there may be no impact on a DL data channel that does not require immediate HARQ-ACK feedback.

Figure 2:
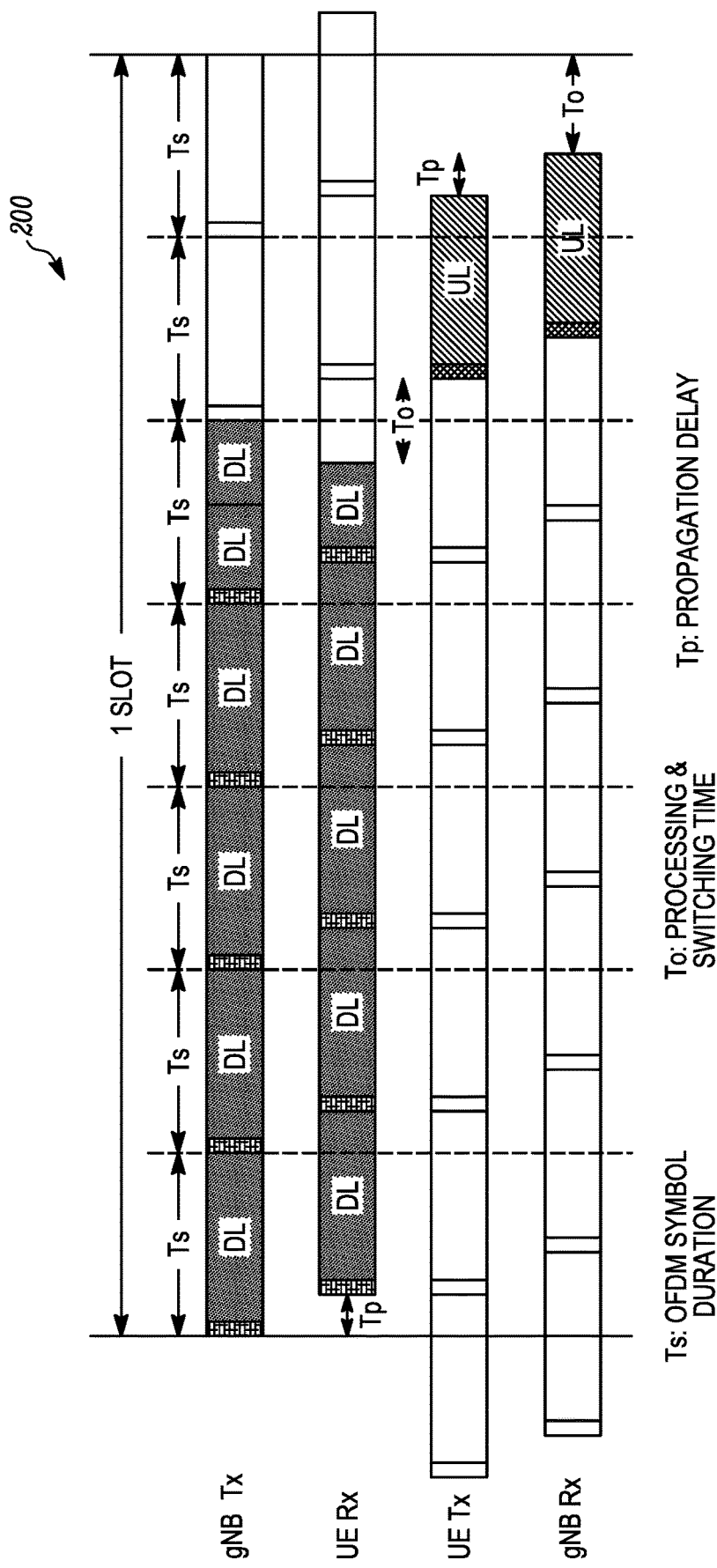
FIG. 2 is an example timing relationship for low-latency operation in a DL-centric slot according to a possible embodiment.

FIG. 2 is an example illustration 200 of a timing relationship for low-latency operation in a DL-centric slot according to a possible embodiment. For example, the illustration 200 shows a timing relationship among a base station, such as a gNodeB (gNB), and UE transmission/reception (Tx/Rx). The timing gap $T_o$ can be created at the end of a slot via the UE's transmit timing advance, in order to provide gNB with processing time and Rx-to-Tx switching time. A gap duration of approximately equal to the symbol duration $T_s$ can be used to accommodate round trip delay ($2T_p$) between the UE and the gNB, UE Rx-to-Tx switching time, and gNB processing and Rx-to-Tx switching time. For example, UE Rx-to-Tx+(gNB processing+Rx-to-Tx) can be $T_o$ and the total can be $2T_p+T_o$. In order to provide at least a half-symbol UE processing time, the gNB can transmit DL data on every other subcarrier for the last DL symbol, and the UE can receive samples corresponding to a first half-symbol and starts demodulation. Mapping DL data on every other subcarrier may only be applied to a DL data channel for a UE requiring immediate HARQ-ACK feedback.

Figure 3:
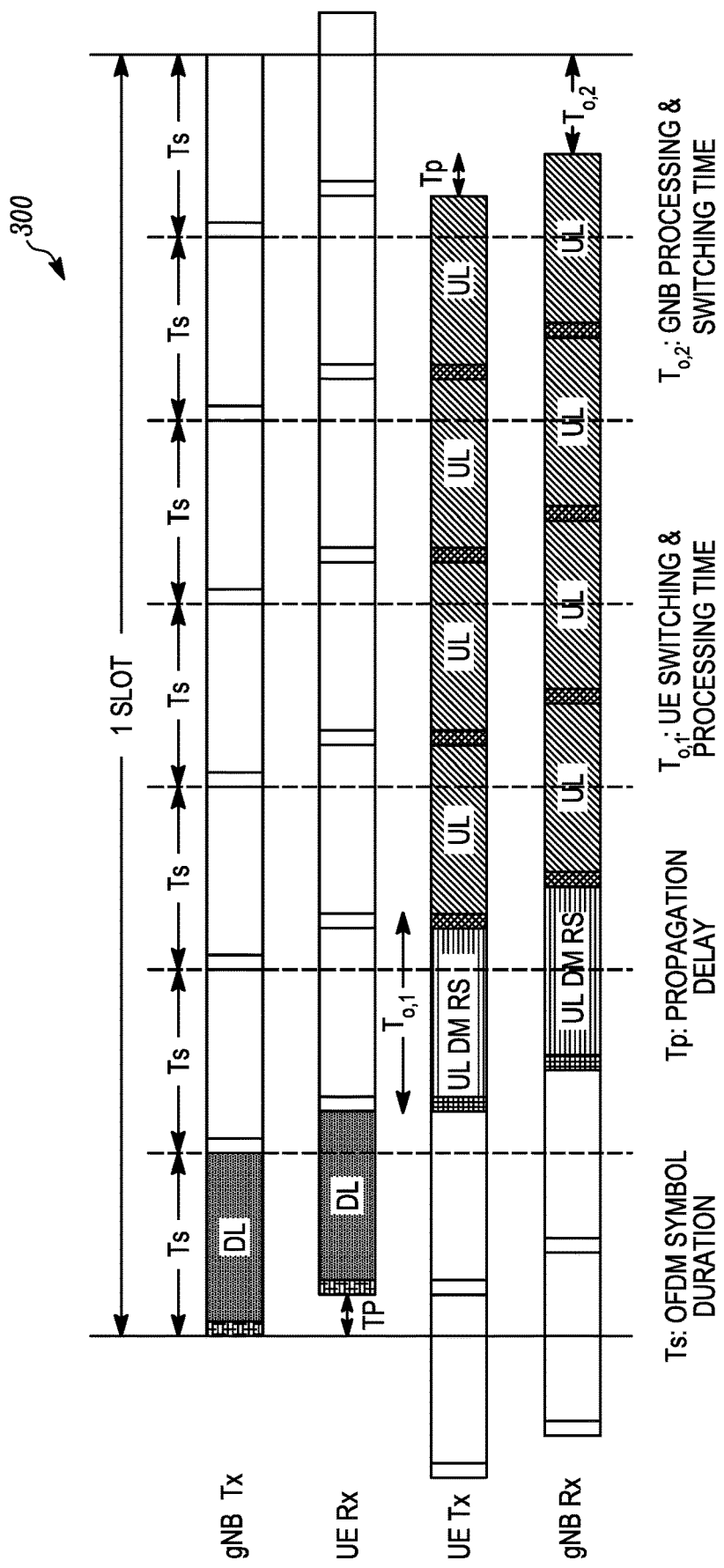
FIG. 3 is an example timing relationship for low-latency operation in an UL-centric slot according to a possible embodiment.

FIG. 3 is an example illustration 300 of a timing relationship for low-latency operation in an UL-centric slot according to a possible embodiment. The illustration 300 can show that placing an UL DMRS in the beginning of an UL data channel can provide a time budget for UE to decode a UL scheduling grant message, such as if the UL DMRS is known to be transmitted in a predetermined location in frequency domain not dependent on the UL scheduling grant message, and to prepare an UL data channel.

According to a possible embodiment, a UE can determine a resource for short PUCCH based on an indicated sub-band group and indicated Resource Block Groups (RBGs) within the indicated sub-band group. A sub-band group can include of one or more sub-bands evenly distributed over a system Bandwidth (BW) and/or a UE's operating bandwidth, and more than one sub-band group can be defined within the system BW and/or UE's operating BW. Each sub-band can include one or more RBGs, and each RBG can include one or more contiguous Resource Blocks (RBs), such as 3 RBs. In one example, a resource block can include 12 subcarriers, or equivalently, 12 Resource Elements (REs).

Figure 4:
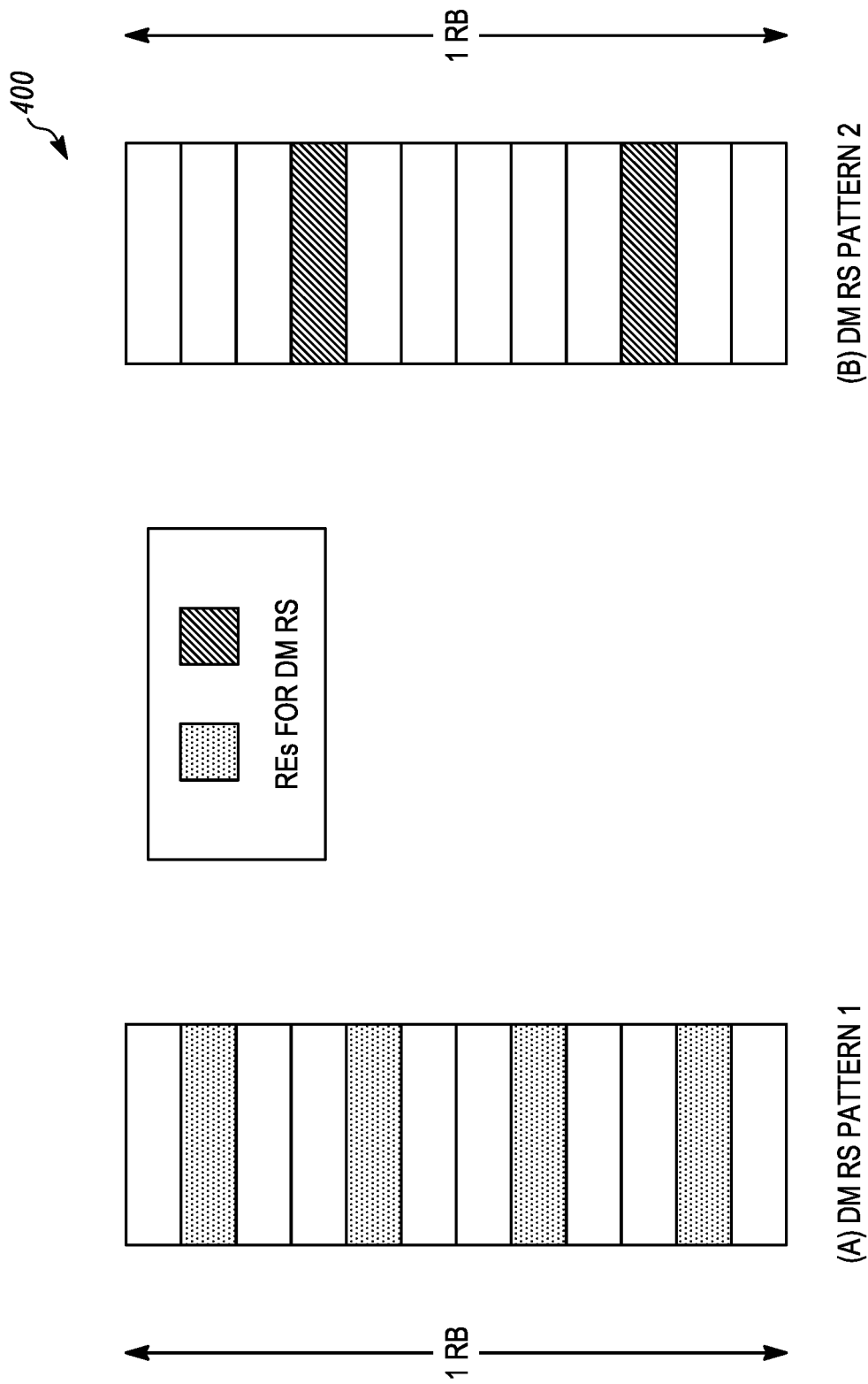
FIG. 4 is an example of resource allocation for DMRS or a sequence-based message.

FIG. 4 is an example illustration 400 of resource allocation for DMRS or a sequence-based message according to a possible embodiment. Since DMRS can be multiplexed with UCI within a RB as shown in the illustration 400, RBG-level resource aggregation for short PUCCH can be beneficial to obtain reliable channel and interference estimates, compared to RB-level resource aggregation. To support a range of UCI sizes, such as 10-100 bits, a limited number of RBG aggregation levels, such as 1, 2, 4, and 8 RBG aggregations, can be defined.

According to a possible embodiment, the NE or gNB can semi-statically configure a UE with a UE-specific sub-band group via a higher-layer signaling, and can dynamically indicate allocated RBGs within the configured UE-specific sub-band group via DCI. According to another possible embodiment, both the sub-band group and allocated RBGs within the sub-band group can be dynamically signaled.

Figure 5:
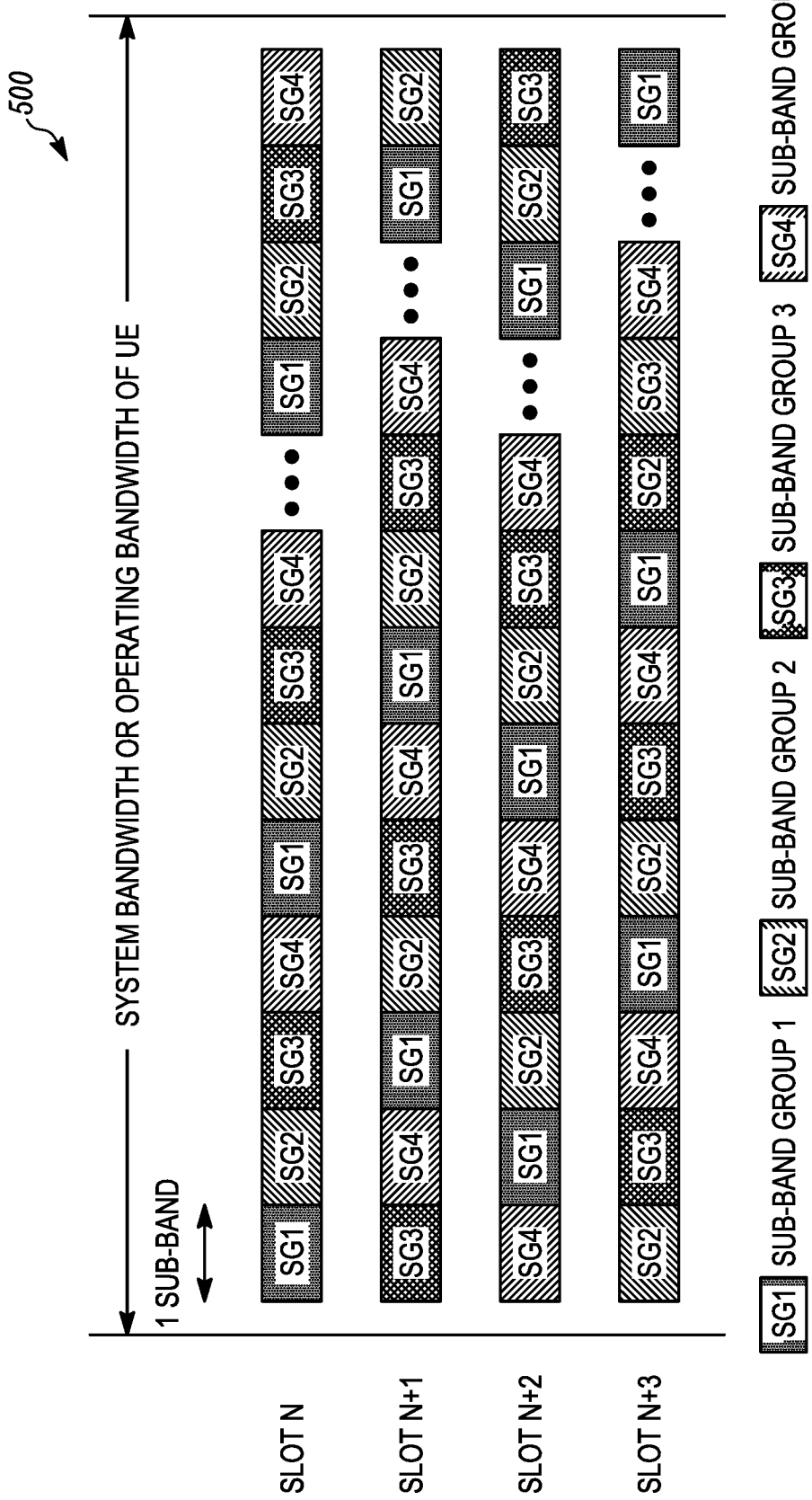
FIG. 5 is an example for frequency hopping of short PUCCH sub-band groups over slots according to a possible embodiment.

FIG. 5 is an example illustration 500 of frequency hopping of short PUCCH sub-band groups over slots according to a possible embodiment. For example, the system transmission bandwidth can be 100 RB and edge 2 RBs of each side of a transmission band can be reserved for long PUCCH, such as UCI transmission spanning over an UL-slot or an UL region of an UL-centric slot, or for UL data. Each sub-band can include 2 RBGs, and each RBG can include 3 RBs. 16 sub-bands can exist in the system, and 4 sub-band groups, such as 4 sub-bands or 8 RBGs per sub-band group, can be defined. For dynamic signaling of short PUCCH RA, 2 bits can be used for selection of sub-band group, and a bitmap of 8 bits can be used to indicate selected RBGs within the selected sub-band group.

Figure 6:
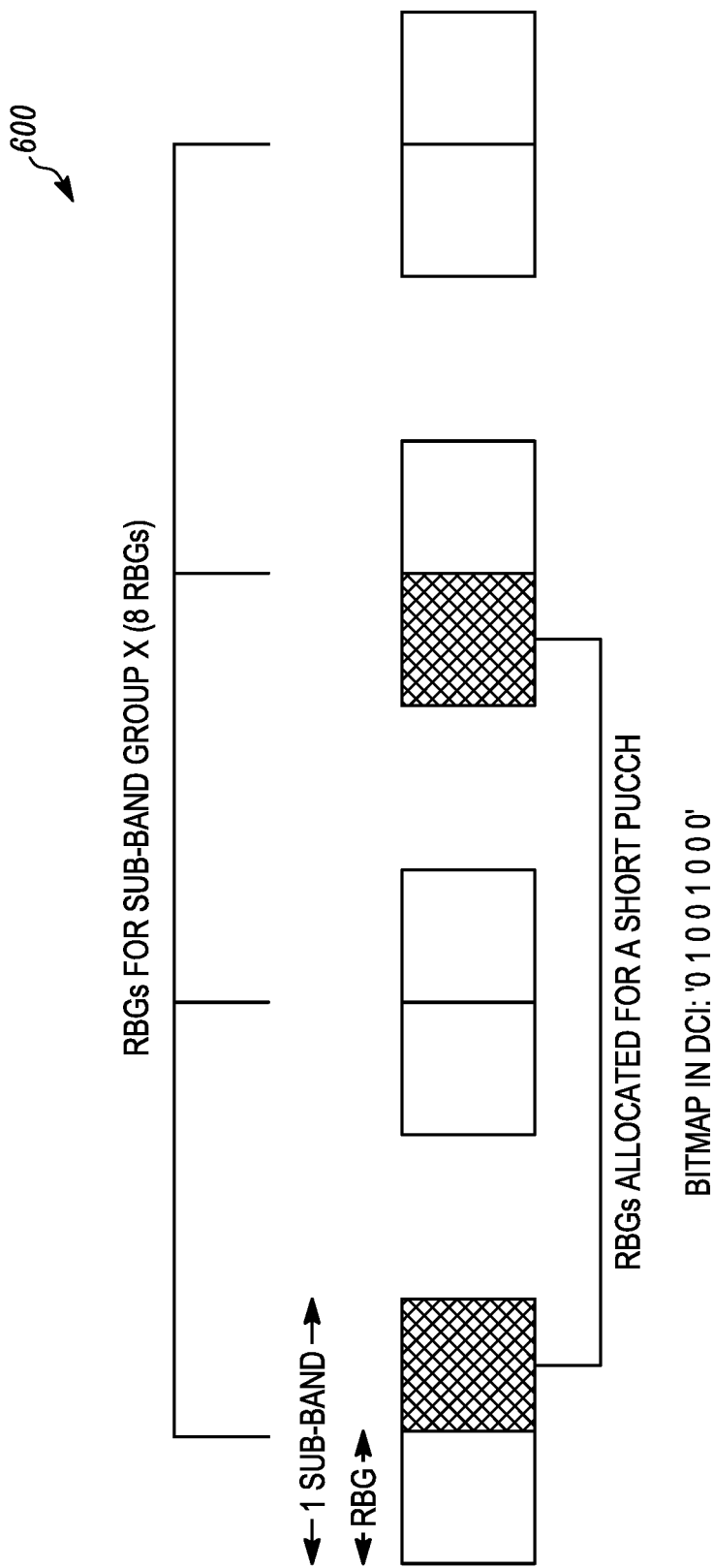
FIG. 6 is an example of resource allocation and signaling for short PUCCH according to a possible embodiment.

FIG. 6 is an example illustration 600 of resource allocation and signaling for short PUCCH according to a possible embodiment. The illustration 600 can show short PUCCH resource allocation with 2 RBG aggregation, and each bit in a bitmap can indicate a resource assignment of a corresponding RBG. In an alternate embodiment, signaling of the selected RBGs can include indication of the RBG aggregation level, such as the number of RBGs, and position of the first selected RBG. The position of the other selected RBGs can be equally spaced with an offset which can be determined as the number of RBGs per sub-band group normalized by the RBG aggregation level.

According to a possible embodiment, a NE can semi-statically configure, via higher-layer signaling of a sub-band group index and RBG bitmap, a UE with a UE-specific resource for a short PUCCH carrying a Scheduling Request (SR). The higher layer can be higher than a physical layer. Frequency-hopping of the sub-band groups over slots, as shown in the illustration 500, can provide frequency diversity and interference randomization for semi-statically configured SR resources.

Additionally, a UE can receive an indication of a selected DMRS pattern for a short PUCCH. According to a possible embodiment, a UE can be semi-statically configured with a DMRS pattern based on UE/NE beamforming capabilities and long-term channel characteristics, such as maximum delay spread. Alternatively, the NE can dynamically indicate the DMRS pattern in a UCI scheduling grant message, depending on UCI sizes in a short PUCCH. For example, a short PUCCH with a small UCI size, such as 10 bits, can be configured with high density DMRS pattern as shown by the DMRS pattern 1 in the illustration 400, while short PUCCH with a large UCI size, such as 40 bits, can be configured with low density DMRS pattern as shown by the DMRS pattern 2 in the illustration 400.

The resource allocation scheme described above can be used for RA of a short duration UL data channel, such as 1~2 symbol non-slot based data transmission, in the short UL control region.

Short PUCCH can carry SR via on/off signaling, 1 or 2 HARQ-ACK bits, or 10~100 bits including CSI and HARQ-ACK. For 10~100 bits UCI, channel coded bits can be mapped to modulation symbols, and the resulting modulation symbols can be transmitted on non-DMRS REs. DMRS based coherent demodulation and decoding can be performed at a receiver. Both SR and 1~2 HARQ-ACK bits can be transmitted via a sequence-based message, and the receiver can perform sequence detection for decoding. A base Zadoff-Chu (ZC) sequence and sequences resulting from time-domain cyclic shifts of the base ZC sequence can be used for DMRS and sequence-based messages. A NE can configure a UE with RBs or RBGs and a sequence for SR semi-statically, and can dynamically allocate RBs or RBGs and 2 or 4 sequences for 1 or 2 HARQ-ACK bits.

As short PUCCH can employ an OFDM waveform and can be applicable to non-power limited UEs, a UE can transmit multiple short PUCCHs carrying different UCI simultaneously. Moreover, HARQ-ACK bits and SR can be transmitted via separate sequences. Thus, the following short PUCCH format can be defined:

Format 1/1a/1b: SR, 1-bit HARQ-ACK, 2-bit HARQ-ACK, respectively

Format 2: 10-100 bits, combination of CSI and HARQ-ACK

According to a possible embodiment, an RB-length, such as a 12 subcarrier/RE, sequence, can be used for short PUCCH format 1/1a/1b, and can be mapped to every RE of an allocated RB and repeated over all the allocated RBs to achieve an SNR processing gain. In this case, RBGs allocated for short PUCCH format 1/1a/1b may not be used for short PUCCH format 2. However, a larger number of cyclic shifts of a base sequence, such as up to 12 cyclic shifts, equivalently a larger number of orthogonal sequences can be supported, such as multiplexed in a given RB, since the sequence can be mapped to contiguous REs. In addition, the SNR gain can be dependent on the total number of allocated RBs ($N_{RB}$) i.e. SNR gain (dB)=$10 \log_{10} N_{RB}$.

According to another possible embodiment, sequences for short PUCCH format 1/1a/1b can be transmitted on REs reserved for DMRS. For example, DMRS pattern 1 in the illustration 400 can result in 12 DMRS REs within an RBG, such as 3 RBs, and a length-12 ZC sequence or its cyclic shifted version for short PUCCH format 1/1a/1b can be mapped to DMRS REs of the RBG. An SNR processing gain can be obtained via RBG-level aggregation, and can be dependent on the number of aggregated RBGs, ($N_{RBG}$), i.e. SNR gain (dB)=$10 \log_{10} N_{RBG}$. In this case, a given RBG can be shared by short PUCCH format 1/1a/1b and format 2. If a short UL data channel in the short UL control region uses the same DMRS pattern and RBG-level resource allocation structure as short PUCCH, short PUCCH format 1/1a/1b can be multiplexed with short UL data channel in a given RBG.

However, the number of allowed cyclic shifts, such as the maximum number of orthogonally multiplexed sequences, of a base sequence can decrease due to increased subcarrier spacing between two adjacent REs used for short PUCCH format 1/1a/1b. For example, up to 4 cyclic shifts of a base ZC sequence can be supported when short PUCCH format 1/1a/1b resource mapping is based on DMRS pattern 1 in the illustration 400. Four orthogonal sequences may be required for a UE in a given RBG to represent 2 bits for short PUCCH format 1b. According to a possible embodiment, a given UE can transmit a short UL data channel and a short PUCCH format 1b together in one or more allocated RBGs, and a network can coherently demodulate the received UL data channel by detecting a sequence of short PUCCH format 1b and performing channel estimation based on the detected sequence. According to another possible embodiment, the UE can use two mutually exclusive subsets of allocated RBGs to transmit short PUCCH format 1b, where each subset of the allocated RBGs can carry 1-bit HARQ-ACK based on 2 orthogonal sequences and selection of one subset of the allocated RBGs can indicate another 1-bit HARQ-ACK.

The symbol/slot in which the UE transmits HARQ/ACK using PUCCH or short PUCCH can depend on the DL search space configured for the UE. For example, the UE can be configured to monitor a set of downlink control channel candidates. Monitoring can imply attempting to decode. The set of control channel candidates monitored by the UE can span a set of OFDM symbols. The set of OFDM symbols for DL control channel monitoring can be typically located in the beginning of a slot/mini-slot. In one example, the slot can include 14 OFDM/SC-FDMA symbols and the mini-slot or non-slot can include from 1 to 13 OFDM/SC-FDMA symbols. The control channel candidates can be mapped to physical resource elements, such as REs or groups of REs, such as REGs, or groups of REGs/REs, such as Control Channel Elements (CCEs), in the set of OFDM symbols according to different implementations.

According to a first example implementation, each control channel candidate can be mapped to REs within a single OFDM symbol within the set of OFDM symbols, but different candidates in the set can belong to different OFDM symbols in the set of OFDM symbols. For example, if 6 control channel candidates c1, c2, . . . , c6 are monitored in 3 OFDM symbols s1, s2, s3, then candidates c1, c2 can be mapped entirely within OFDM symbol s1; candidates c3, c4 can be mapped entirely within OFDM symbol s2; and candidates c5, c6 can be mapped entirely within OFDM symbol s3.

Figure 7:
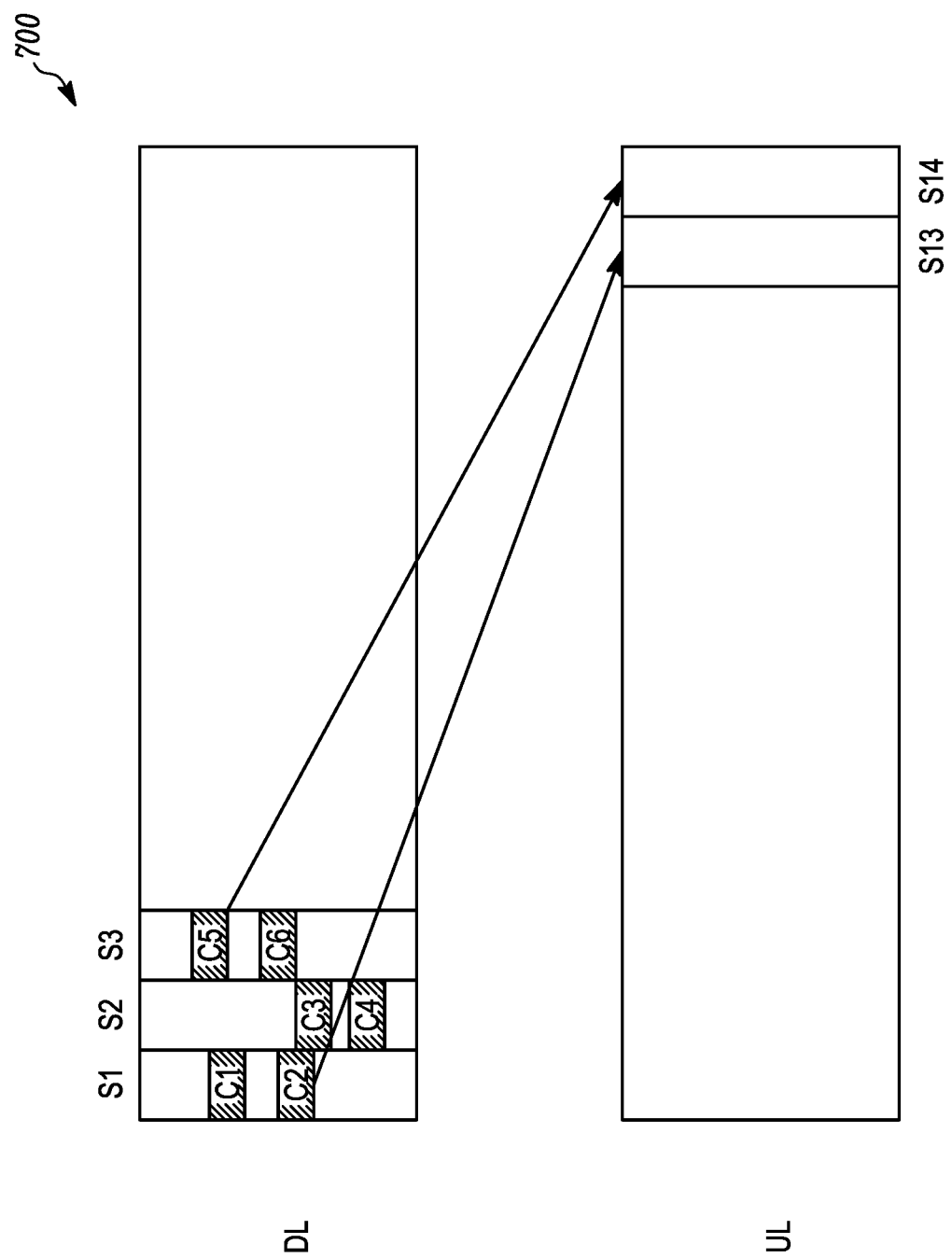
FIG. 7 is an example of UL HARQ-ACK transmission symbol determination based on OFDM symbol of DL control channel candidate according to a possible embodiment.

FIG. 7 is an example illustration 700 of UL HARQ-ACK transmission symbol determination based on the OFDM symbol of DL control channel candidate according to a possible embodiment. Considering the possibilities discussed above for receiving control signaling, if the control channel candidate is mapped according to the first implementation, such as entirely within a symbol of a set of symbols, the UL OFDM/SC-FDMA symbol/slot position for the HARQ-ACK corresponding to the control channel candidate, such as the HARQ-ACK corresponding to the data decoded based on the DL resource assignment determined from the decoded control channel candidate, can be determined based on the OFDM symbol in which all the REs of the control channel candidate are located. For example, if DL control channel candidates c1, c2 are monitored in OFDM symbol s1, candidates c3, c4 are monitored in OFDM symbol s2, and candidates c5, c6 are monitored in OFDM symbol s3 of slot x according to the example described for the first example implementation above. If the UE determines its DL assignment by decoding candidate c1 or c2, such as those present in OFDM symbol s1, it can transmit the corresponding HARQ-ACK in OFDM symbol s13 of slot x. If the UE determines its DL assignment by decoding a candidate, such as c3, c4, in a later symbol, such as symbol s2 or s3, it can transmit the corresponding HARQ-ACK in OFDM symbol s14 of slot x. Hence, the UL OFDM symbol in which HARQ-ACK is sent can be determined based on the DL OFDM symbol in which the corresponding control channel candidate is decoded. This example is also illustrated in the illustration 700. In another example, if the UE determines its DL assignment by decoding candidate c1, c2, c3, or c4, such as those present in OFDM symbol s1 or s2, it can transmit a corresponding HARQ-ACK in OFDM symbol s14 of slot x. If the UE determines its DL assignment by decoding candidate c5 or c6, such as those present in OFDM symbol s3, it can transmit a corresponding HARQ-ACK in OFDM symbol s14 of slot x+1. Hence, the UL slot in which HARQ-ACK is sent can be determined based on the DL OFDM symbol index in which the corresponding control channel candidate is decoded.

According to a second example implementation, each control channel candidate can be mapped to REs within multiple OFDM symbols within the set of OFDM symbols. For example, if 6 control channel candidates c1, c2, . . . c6 are monitored in 4 OFDM symbols s1, s2, s3, s4, then c1, c2 can be mapped to REs spanning OFDM symbols s1, s2. Similarly, c3, c4 can be mapped to REs spanning OFDM symbols s3, s4, while c5, c6 can be mapped to REs spanning all four OFDM symbols s1, s2, s3, s4.

As discussed above, if the UE successfully decodes a control channel candidate, determines a DL resource assignment from the decoded candidate, and decodes data, such as on a PDSCH, using the DL resource assignment, the UL OFDM/SC-FDMA symbol/slot in which the UE sends HARQ-ACK, such as on a PUCCH/short PUCCH, corresponding to the decoded data can vary based on the DL OFDM symbol in which the corresponding control channel candidate is decoded.

If the control channel candidate is mapped according to the second example implementation, such as within multiple symbols of a set of symbols, the HARQ-ACK symbol/slot location corresponding to the control channel candidate, such as the HARQ-ACK corresponding to the data decoded based on the DL resource assignment determined from the decoded control channel candidate, can be determined based on the last OFDM symbol in which the REs of the control channel candidate are located. For example, if the REs of a candidate c1 are mapped to OFDM symbols s1, s2 of slot x, then a corresponding HARQ-ACK can be sent in UL OFDM symbol s13 of slot x. If the REs of a candidate c2 are mapped to OFDM symbols s2, s3 of slot x, then corresponding HARQ-ACK can be sent in UL OFDM symbol s14 of slot x.

In the above examples, each DL or UL slot is assumed to have 14 OFDM symbols (s1, s2, . . . s14) with symbol s1 in the beginning of the slot and symbol s14 at the end of the slot. It should be noted that the OFDM symbol corresponding to the DL control channel candidate, such as the OFDM symbol in which all REs of the candidate are present according to the first implementation or the last OFDM symbol in which the REs of a candidate are mapped according to the second implementation, can be one of multiple criteria used in determining the resource used for HARQ-ACK transmission for data associated with the DL assignment given by the control channel candidate. For example, the UE can use the DL OFDM symbol corresponding to the decoded DL control channel candidate to determine a UL OFDM symbol/slot for transmitting a corresponding HARQ-ACK, such as a HARQ-ACK corresponding to the data decoded based on the DL resource assignment determined from the decoded control channel candidate, and the UE can use an RB index, such as the lowest RB index, from the RBs given in the DL assignment to determine a HARQ- ACK resource index within the determined UL OFDM symbol/slot; and the UE can transmit HARQ-ACK in a HARQ-ACK resource with the determined HARQ-ACK index in the determined UL OFDM symbol/slot.

In another example, the UE can use the DL OFDM symbol corresponding to the decoded DL control channel candidate to determine a UL OFDM symbol/slot for transmitting corresponding HARQ-ACK, such as the HARQ-ACK corresponding to the data decoded based on the DL resource assignment determined from the decoded control channel candidate, and the UE can use a CCE index, such as the lowest CCE index, of the decoded control channel candidate to determine a HARQ-ACK resource index within the determined UL OFDM symbol/slot; and the UE can transmit HARQ-ACK in a HARQ-ACK resource with the determined HARQ-ACK index in the determined UL OFDM symbol/slot.

The approaches described above can be useful reducing UE complexity by giving the UE enough processing time to decode data and send HARQ-ACK based on when the UE finishes its control channel decoding. For example, if the control channel candidate is decoded early because it is sent in an earlier DL OFDM symbol, a corresponding HARQ-ACK can be sent in an earlier UL OFDM symbol, and if the control channel candidate is decoded later because it is sent in an later DL OFDM symbol, a corresponding HARQ-ACK can be sent in a later UL OFDM symbol without forcing the UE to implement a tighter HARQ processing timeline based on the last possible DL OFDM symbol for control channel decoding and the first possible UL OFDM symbol/slot for corresponding HARQ-ACK transmission.

Another reason for delay in DL control channel decoding can be the number of control channel candidates that the UE is expected to monitor. To address this issue, the UL OFDM symbol/slot in which the UE sends HARQ-ACK can be varied based on the number of control channel candidates that the UE is expected to monitor. For example, if the UE monitors a small number, such as n1=4, of control channel candidates, the corresponding HARQ-ACK for a successfully decoded control channel candidate, such as a HARQ-ACK corresponding to the data decoded based on the DL resource assignment determined from the decoded control channel candidate, can be sent in an earlier UL symbol/slot, such as in symbol 14 of slot x. If the UE monitors a large number, such as n2=32, of control channel candidates, the corresponding HARQ-ACK for a successfully decoded control channel candidate can be sent in a later UL symbol/slot, such as in symbol 14 of slot x+1. The number of control channel candidates monitored by the UE can be indicated via a higher layer, such as Radio Resource Control (RRC) or Medium Access Control (MAC) layer, signaling, where the higher layer is higher than the physical layer. The number of control channel candidates monitored by the UE can be a number of control channel candidates monitored by the UE within a slot/mini-slot.

In the present disclosure, a "UL OFDM symbol" can also be a "UL DFT-S-OFDM symbol" or "UL SC-FDMA symbol."

Some embodiments below can provide a time budget for low-latency operation.

Figure 8:
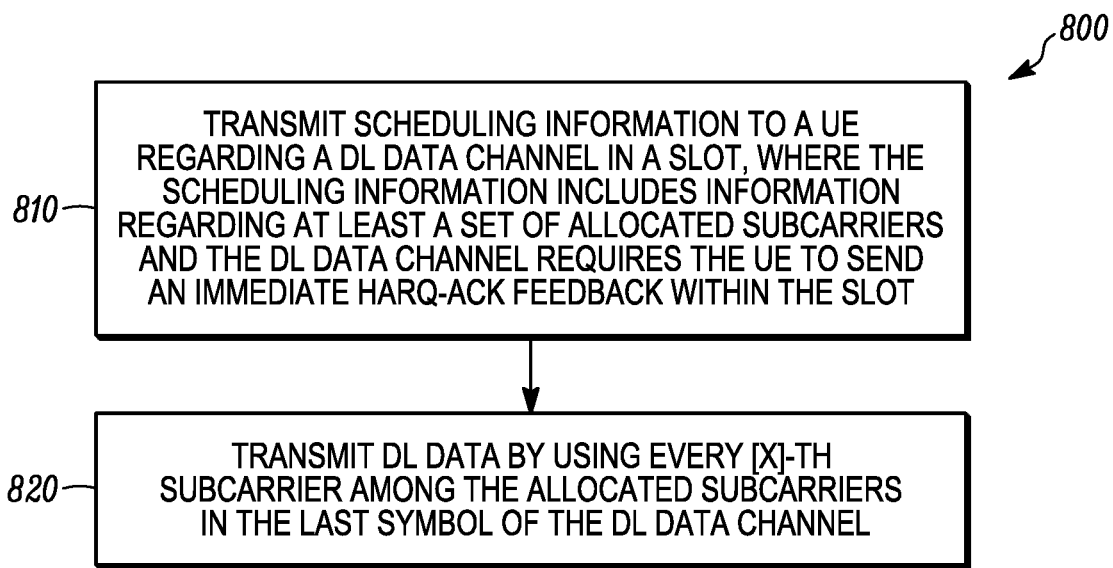
FIG. 8 is an example flowchart illustrating the operation of a wireless communication device according to a possible embodiment.

FIG. 8 is an example flowchart 800 illustrating the operation of a wireless communication device, such as a network entity, according to a possible embodiment. The network entity can be a base station, such as an eNB, a gNB, or other base station, can be an access point, can be a network controller, can be a mobility management entity, or can be any other network entity or combination of network entities that performs DL transmission in a carrier frequency.

At 810, scheduling information can be transmitted to a UE regarding a DL data channel in a slot. The scheduling information can include information regarding at least a set of allocated subcarriers. The DL data channel can require the UE to send an immediate HARQ-ACK feedback within the slot. The scheduling information can be determined by a controller at the network entity or at another network entity and can be transmitted in a PDCCH. The DL data channel can be a PDSCH.

At 820, DL data can be transmitted using every x-th subcarrier among the allocated subcarriers in the last symbol of the DL data channel A value of x can be greater than one. For example, when x is 2, the DL data can be transmitted every second subcarrier among the allocated subcarriers in the last symbol of the DL data channel. As a further example, every x-th subcarrier can be every subcarrier that skips a number of subcarriers. A value of x can be set based on UE processing capability and the value of x can be indicated to the UE.

The UE can receive only a first part of time-domain samples out of x repeated samples in the last symbol of the DL data channel. The UE can demodulate and decode the DL data channel by employing a first Fast Fourier Transform (FFT) size in symbols except for the last symbol and a second FFT size in the last symbol. The second FFT size can be smaller than the first FFT size by a factor of a value of x.

One OFDM symbol can include N_CP (cyclic prefix) samples and N samples in time, sequentially. If the N/x data is mapped to every x-th subcarrier in the frequency domain at a gNB transmitter, the resulting OFDM symbol before appending cyclic prefix can have x repetitions of N/x samples. If the UE receiver receives CP and the first N/x samples, removes CP, and applies FFT of size N/x, the resulting FFT output can correspond to N/x subcarriers carrying N/x data.

Figure 9:
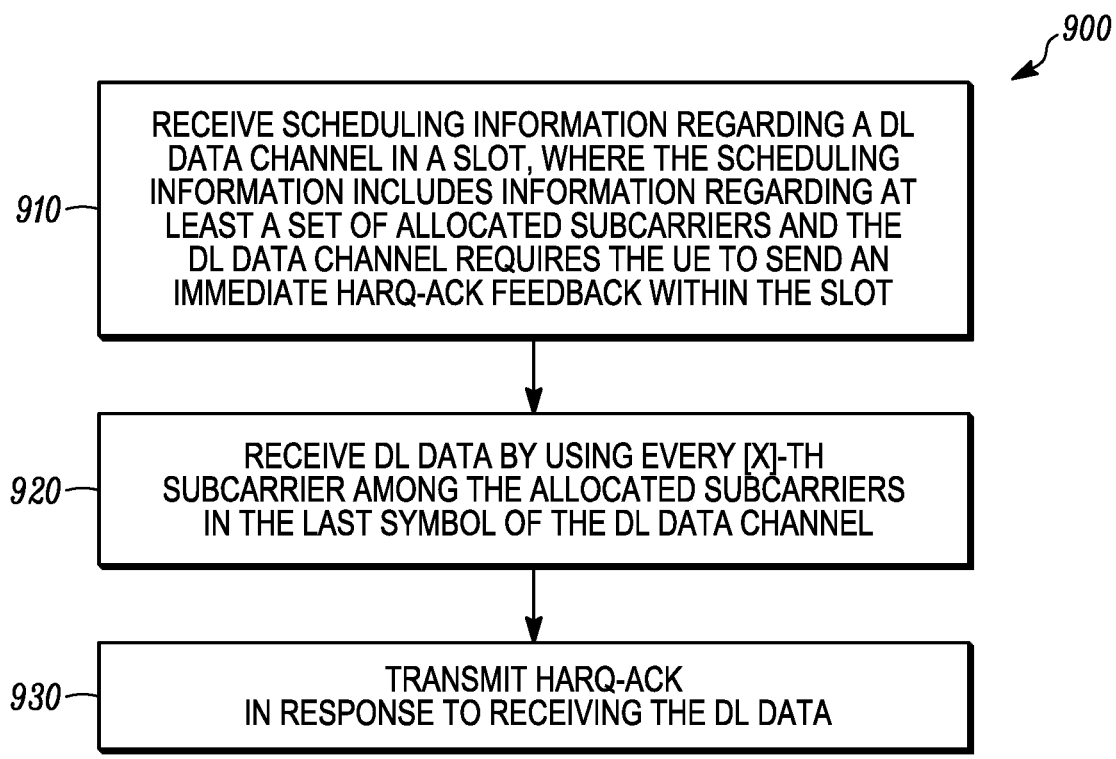
FIG. 9 is an example flowchart illustrating the operation of a wireless communication device according to a possible embodiment.

FIG. 9 is an example flowchart 900 illustrating the operation of a wireless communication device, such as the UE 110 or any other terminal that sends and receives wireless communication signals over a wireless wide area network, according to a possible embodiment. At 910, scheduling information can be received from a network entity. The scheduling information can regard a DL data channel in a slot. The scheduling information can include information regarding at least a set of allocated subcarriers. The DL data channel can require the UE to send an immediate HARQ-ACK feedback within the slot.

At 920, DL data can be received using every x-th subcarrier among the allocated subcarriers in the last symbol of the DL data channel. The value of x can be greater than one. For example, every x-th subcarrier can be every subcarrier that skips a given number of subcarriers. The value of x can be received from a network entity. The value of x can be set based on UE processing capability.

Only a first part of time-domain samples out of x repeated samples can be received in the last symbol of the DL data channel. The DL data channel can be demodulated and decoded by employing a first FFT size in symbols except for the last symbol and a second FFT size in the last symbol. The second FFT size can be smaller than the first FFT size by a factor of x. Remaining time after receiving only a first part of time-domain samples in the last symbol can be used for processing time of decoding DL data. At 930, a HARQ-ACK can be transmitted in response to receiving the DL data.

Figure 10:
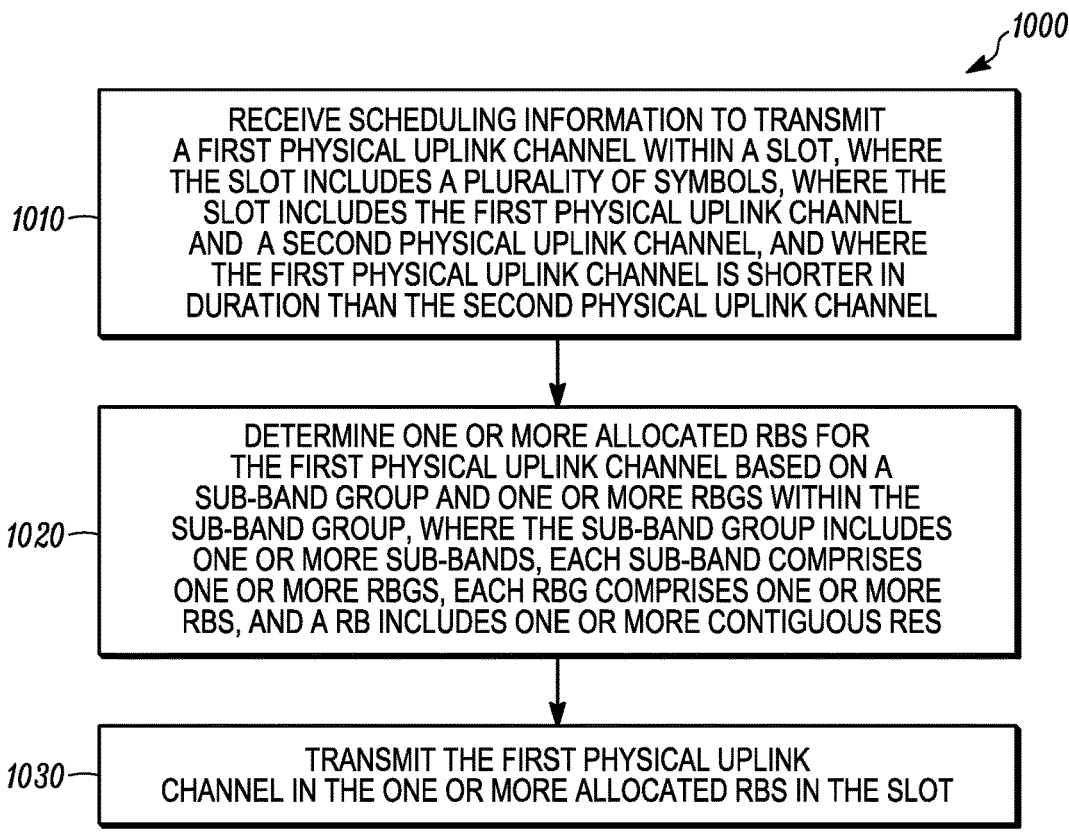
FIG. 10 is an example flowchart illustrating the operation of a wireless communication device according to a possible embodiment.

FIG. 10 is an example flowchart 1000 illustrating the operation of a wireless communication device, such as the UE 110 or any other terminal that transmits and receives wireless communication signals over a wireless wide area network, according to a possible embodiment. For example, the flowchart 1000 can be for a method in a UE to perform uplink transmission in a carrier frequency.

At 1010, scheduling information can be received. The scheduling information can schedule at least one resource for the UE to transmit the first uplink channel. For example, the scheduling information can include information for a scheduling request transmission, information for transmitting HARQ-ACK, and/or other information. A Scheduling Request (SR) can be part of Uplink Control Information (UCI) from a UE to a network, can be semi-statically configured, can be 1 RB, and/or can be in a sub-band group.

Receiving scheduling information can include semi-statically receiving an indication of the sub-band group via a higher-layer signaling and dynamically receiving an indication of allocated RBGs within the indicated sub-band group via DCI. Receiving scheduling information can also include semi-statically receiving both an indication of the sub-band group and an indication of allocated RBGs within the indicated sub-band group via a higher-layer signaling. Receiving scheduling information can also include dynamically receiving both an indication of the sub-band group and an indication of allocated RBGs within the indicated sub-band group via DCI.

The scheduling information can indicate the sub-band group and the one or more RBGs within the sub-band group. The sub-band group can be indicated by being transmitted as part of DCI, can be indicated by using an RRC message, can be indicated via other layers higher than a physical layer, or can be otherwise indicated, such as by a network entity. According to a possible implementation, resource allocation for the first physical uplink channel can allow a set of RBG aggregation levels. The set of RBG aggregation levels can include 1, 2, 4, and 8 RBG's. For example, a short PUCCH resource allocation can allocate resources to the short PUCCH and the allocated resources can include aggregated RBG's that can be aggregated in a group of 1, 2, 4, and/or 8 RBG's. The aggregation of RBG's may or may not be contiguous.

The one or more sub-bands in the sub-band group can be distributed over a UE's configured operating BW. The UE's configured operating BW can include at least one sub-band group. A system BW including the UE's configured operating BW can include at least one sub-band group. For example, the sub-bands in the sub-band group can be evenly and non-contiguously distributed over the system BW and/or the UE's configured BW. As a further example, the sub-band group can include of one or more sub-bands evenly distributed over a UE's operating bandwidth, and more than one sub-band group can be defined within the UE's operating BW and/or a system BW including the UE's operating BW.

Sub-band groups of the at least one sub-band group can be frequency hopped in different slots. For example, at least one sub-band group can be in a first sub-band of frequencies in one slot and can be in a second sub-band of frequencies in a next slot.

The scheduling information can be for transmitting a first physical uplink channel within a slot. The first physical uplink channel can span, at least one symbol, such as at least one of a last three symbols, of the slot. For example, the first physical uplink channel can be a Physical Uplink Shared Channel (PUSCH) and/or a Physical Uplink Control Channel (PUCCH) that spans up to two symbols of the slot. Time-frequency resources of the first physical uplink channel can be shared between multiple UE's.

The slot can include a plurality of symbols, such as 2, 3, 7, 14 or any number of symbols, and the first physical uplink channel can span at least one of two symbols of the slot. The slot can include the first physical uplink channel and can also include a second physical uplink channel. The first physical uplink channel can be shorter in duration than the second physical uplink channel.

At 1020, one or more allocated RBs for the first physical uplink channel can be determined based on a sub-band group and one or more RBGs within the sub-band group. The sub-band group can include one or more sub-bands. Each sub-band can include one or more RBGs. Each RBG can include one or more RBs. A RB can include one or more contiguous REs in the frequency domain. For example, a RB can include one or more contiguous subcarriers where each subcarrier can include an RE. Also, number of DL control channel candidates belonging to a set of control channel decoding candidates can be determined and the time-frequency resource for a PUCCH carrying the HARQ-ACK can be determined in a determined one or more allocated resource blocks, such as in 1020 of the flowchart 1000, at least based on the number of DL control channel decoding candidates belonging to the set of control channel decoding candidates.

A slot can include a first PUCCH and a second PUCCH. The first PUCCH can be shorter in duration than the second PUCCH. The first physical uplink channel can the first PUCCH. The first PUCCH can have one of following short PUCCH formats based on UCI type and sizes:

Format 1: SR,
Format 1a: 1-bit HARQ-ACK,
Format 1b: 2-bits HARQ-ACK, or
Format 2: combination of CSI and HARQ-ACK bits.

A sequence-based message can be used for SR, 1-bit HARQ-ACK, and 2-bit HARQ-ACK transmitted on the first physical uplink channel. An RB-length sequence used for SR, 1-bit HARQ-ACK, and 2-bit HARQ-ACK, can be mapped to every RE of an allocated RB. Also, a sequence used for the SR, the 1-bit HARQ-ACK, and the 2-bit HARQ-ACK can be transmitted on REs reserved for DMRS in at least one allocated RBG and/or allocated RB. A base sequence and sequences resulting from time-domain cyclic shifts of the base sequence can be used for DMRS and sequence-based messages.

At 1030, the first physical uplink channel can be transmitted in the determined one or more allocated RBs in the slot. The first physical uplink channel can be transmitted with an OFDM waveform and a DMRS can be frequency-division multiplexed with at least one UL data and/or UCI in the first physical uplink channel Multiple short PUCCHs carrying different UCI can be transmitted simultaneously. According to a possible implementation, the first physical uplink channel can be transmitted with 2-bits HARQ-ACK that is indicated based on selection of one selected from two mutually exclusive subsets of allocated RBs, and based on selection of one selected from two allocated sequences.

According to another possible implementation, the slot can include a first PUCCH and a second PUCCH. The first PUCCH can be shorter in duration than the second PUCCH. The slot can also include a first PUSCH and a second PUSCH. The first PUSCH can be shorter in duration than the second PUSCH. The first physical uplink channel can be at least one selected from the first PUCCH and the first PUSCH. The first PUCCH and the first PUSCH can be transmitted together in at least one allocated RBGs and/or allocated RBs, wherein the first PUCCH can include the sequence used for the SR, the 1-bit HARQ-ACK, and the 2-bit HARQ-ACK.

Figure 11:
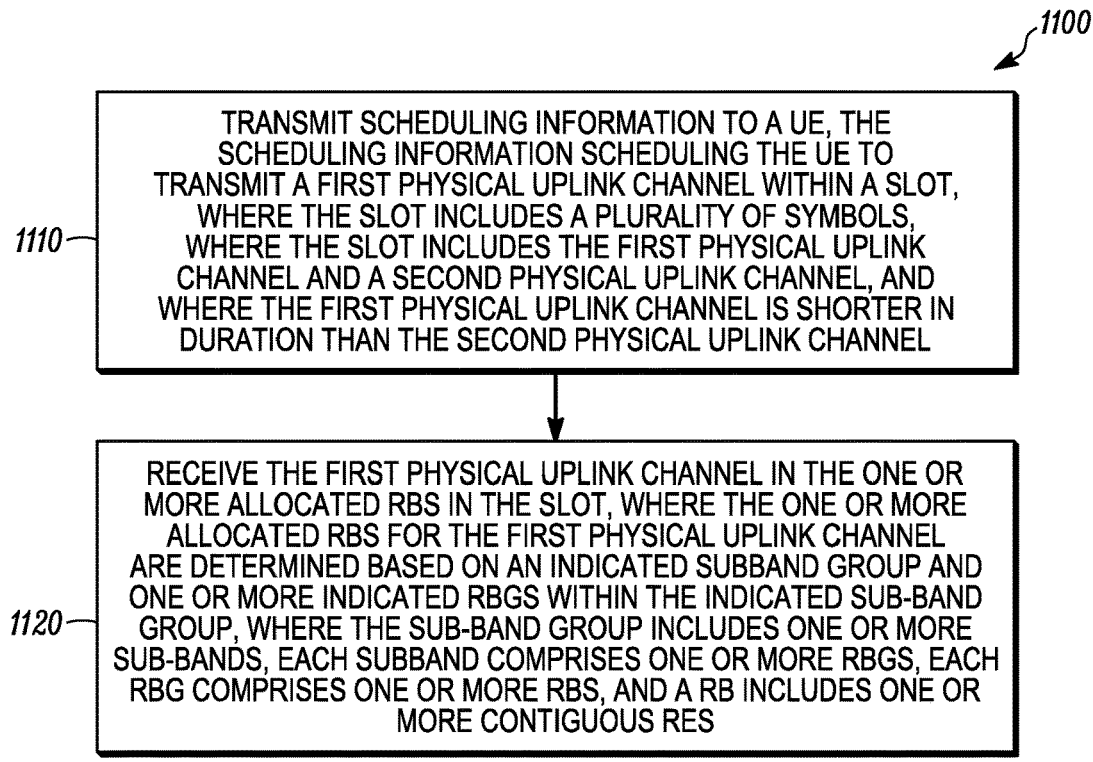
FIG. 11 is an example flowchart illustrating the operation of a wireless communication device according to a possible embodiment.

FIG. 11 is an example flowchart 1100 illustrating the operation of a wireless communication device, such as a network entity, according to a possible embodiment. The network entity can be a base station, such as the base station 120, an access point, a network controller, a mobility management entity, or any other network entity or combination of network entities that transmit scheduling information over a wireless wide area network.

At 1110, scheduling information can be transmitted to a UE. The scheduling information can schedule the UE to transmit a first physical uplink channel within a slot. The slot can include a plurality of symbols. The slot can also include the first physical uplink channel and a second physical uplink channel. The first physical uplink channel can be shorter in duration than the second physical uplink channel. The first physical uplink channel can span at least one of a last three symbols of the slot.

At 1120, the first physical uplink channel can be received in the one or more allocated RBs in the slot. The one or more allocated RBs for the first physical uplink channel can be determined based on an indicated sub-band group and one or more indicated RBGs within the indicated sub-band group. The sub-band group can include one or more sub-bands. Each sub-band can include one or more RBGs. Each RBG can include one or more RBs. A RB can include one or more contiguous REs. The one or more allocated RBs for the first physical uplink channel can be determined based on an indicated sub-band group and one or more indicated RBGs within the indicated sub-band group.

Figure 12:
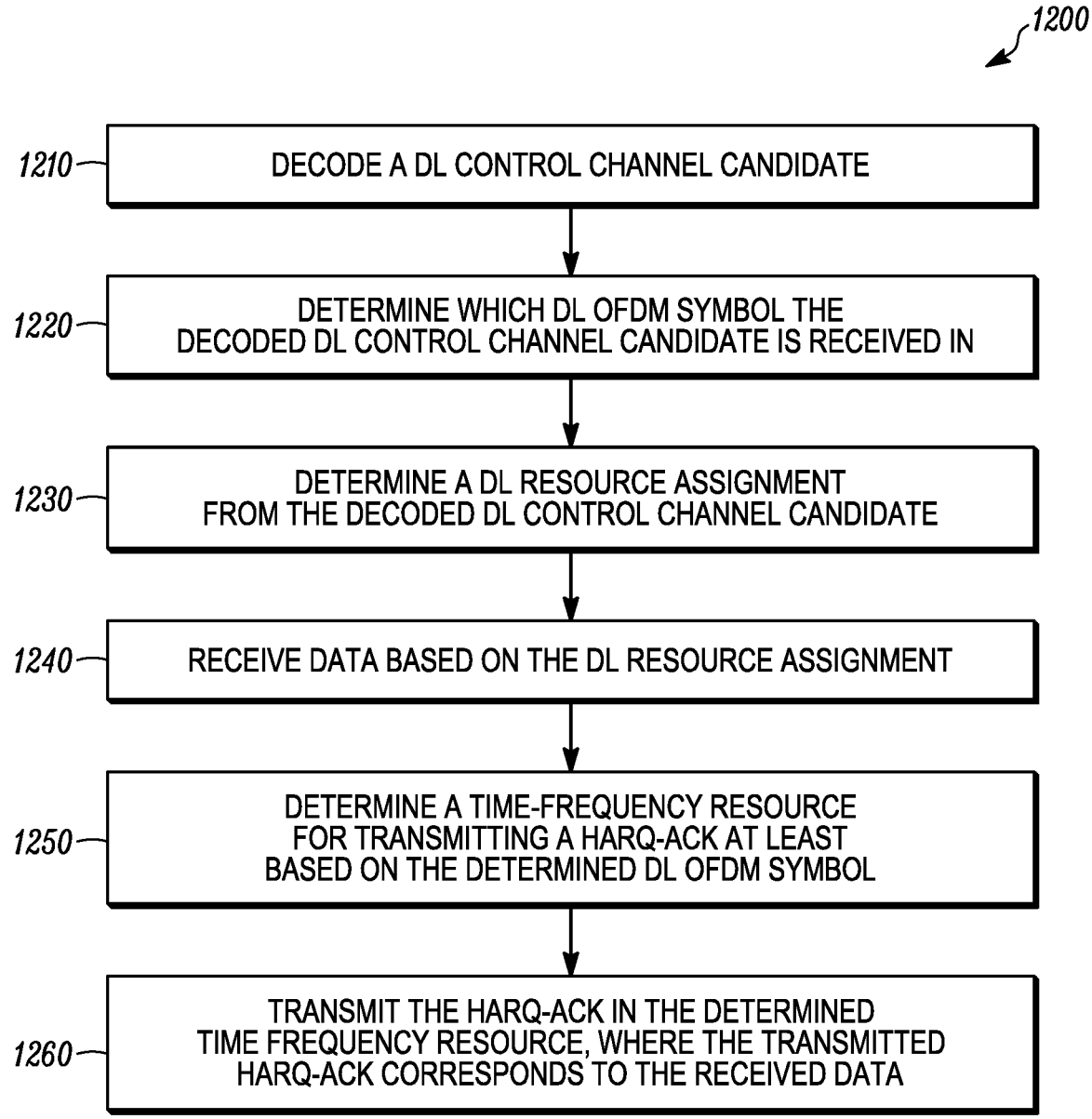
FIG. 12 is an example flowchart illustrating the operation of a wireless communication device according to a possible embodiment.

FIG. 12 is an example flowchart 1200 illustrating the operation of a wireless communication device, such as the UE 110 or any other terminal that transmits and receives wireless communication signals over a wireless wide area network, according to a possible embodiment. At 1210, a DL control channel candidate can be decoded. Decoding can include decoding the DL control channel candidate in a slot.

At 1220, a determination can be made as to which DL OFDM symbol the decoded DL control channel candidate is received in. For example, the DL OFDM symbol can be determined to be received in the slot in which the DL control channel candidate is decoded. According to a possible implementation, each control channel candidate can be mapped to REs within multiple OFDM symbols. For example, the DL control channel candidate can be one of a plurality of DL control channel candidates, where each DL control channel candidate can be mapped to REs within multiple OFDM symbols and a last DL OFDM symbol of multiple OFDM symbols corresponding to the decoded DL control channel candidate can be determined to be the DL OFDM symbol.

At 1230, a DL resource assignment can be determined from the decoded DL control channel candidate. At 1240, data can be received based on the DL resource assignment.

At 1250, a time-frequency resource for transmitting a HARQ-ACK can be determined at least based on the determined DL OFDM symbol. For example, an UL OFDM symbol in the slot for transmitting HARQ-ACK can be determined at least based on the determined DL OFDM symbol. According to another possible implementation, the time-frequency resource for transmitting a HARQ-ACK can be determined in the one or more allocated resource blocks determined in 1020 of the flowchart 1000.

According to a possible implementation, a number of DL control channel candidates belonging to a set of control channel decoding candidates can be determined and a time-frequency resource for a PUCCH carrying the HARQ-ACK can be determined at least based on the number of DL control channel decoding candidates belonging to the set of control channel decoding candidates.

At 1260, the HARQ-ACK can be transmitted in the determined time-frequency resource. For example, the HARQ-ACK can be transmitted in the determined UL OFDM symbol. The transmitted HARQ-ACK can correspond to the received data. According to a possible implementation, the data can be received in a resource assigned by the DL resource assignment and the HARQ-ACK can be transmitted in the determined time-frequency resource in response to receiving the data based on the DL resource assignment. According to another possible implementation, the, the HARQ-ACK can be transmitted in the determined time-frequency resource in the determined one or more allocated resource blocks.

According to a possible embodiment, the DL control channel candidate can be decoded in a slot. The DL OFDM symbol can be determined to be received in the slot in which the DL control channel candidate is decoded. Determining a time-frequency resource for transmitting HARQ-ACK at least based on the determined DL OFDM symbol further can include determining a subsequent slot for transmitting HARQ-ACK at least based on the determined DL OFDM symbol. The HARQ-ACK can be transmitted in the determined subsequent slot, where the transmitted HARQ-ACK can correspond to the received data.

According to another possible embodiment, determining a DL OFDM symbol the decoded DL control candidate is received in can include determining the DL OFDM symbol from one of a first DL OFDM symbol and a second OFDM DL symbol corresponding to the decoded DL control channel candidate. The first OFDM symbol can occur earlier in time than the second OFDM symbol. Transmitting the HARQ-ACK can include transmitting the HARQ-ACK in a first time-frequency resource if the determined DL OFDM symbol is the first DL OFDM symbol. Transmitting the HARQ-ACK can also include transmitting the HARQ-ACK in a second time-frequency resource if the determined DL OFDM symbol is the second DL OFDM symbol. The first time-frequency resource can occur earlier in time than the second time-frequency resource. According to a possible implementation, the first time-frequency resource can be within a first UL symbol in a slot and the second time-frequency resource can be within a second UL symbol in the slot. The first UL symbol can occur before the second UL symbol. According to another possible implementation, the first time-frequency resource can be within a first slot and the second time-frequency resource can be within a second slot. The first slot can occur before the second slot. According to another possible implementation, a RB index for receiving data can be determined from the DL resource assignment and the time-frequency resource for transmitting HARQ-ACK can be determined based on the determined RB index. According to another possible implementation, a CCE index corresponding to the DL control channel candidate can be determined and the time-frequency resource for transmitting HARQ-ACK can be determined based on the determined CCE index.

Figure 13:
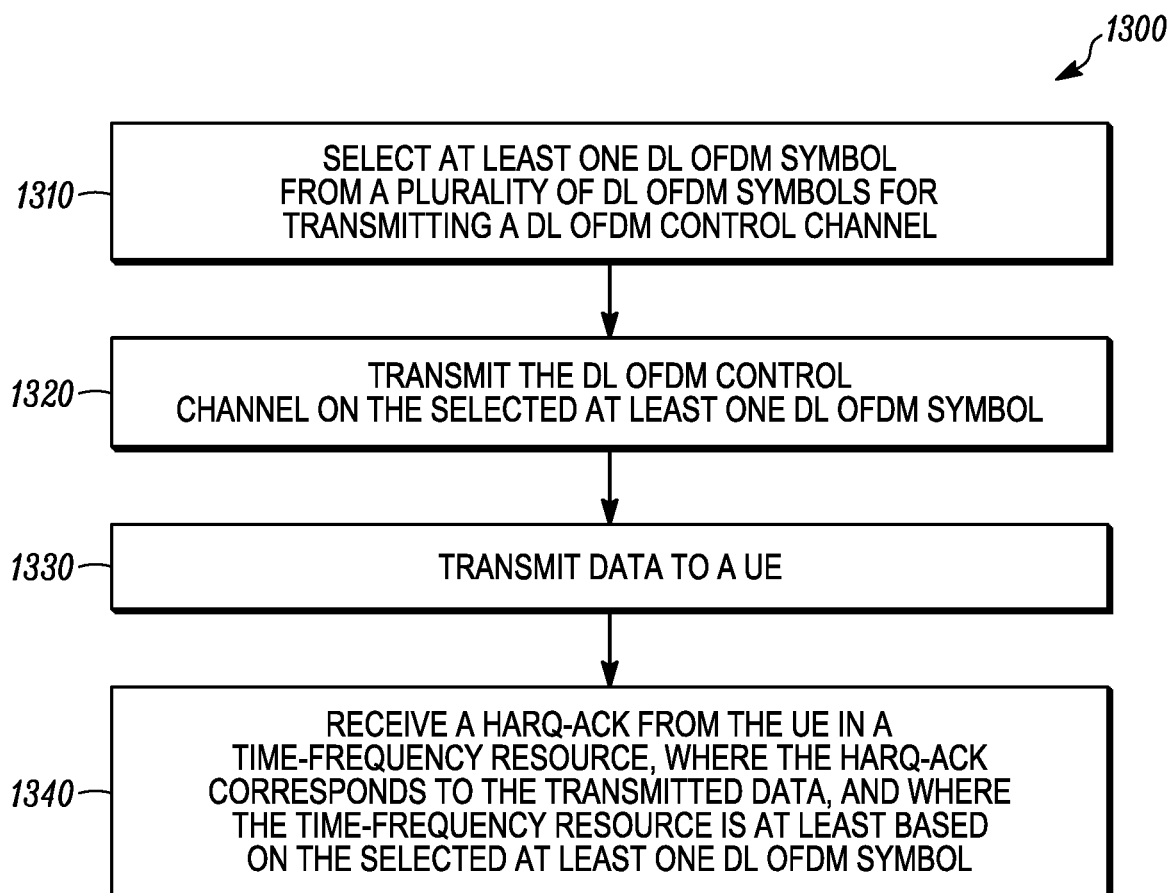
FIG. 13 is an example flowchart illustrating the operation of a wireless communication device according to a possible embodiment.

FIG. 13 is an example flowchart 1300 illustrating the operation of a wireless communication device, such as a network entity, according to a possible embodiment. The network entity can be a base station, an access point, a network controller, a mobility management entity, or any other network entity or combination of network entities that transmit a control channel over a wireless wide area communication network to a user equipment.

At 1310, at least one DL OFDM symbol can be selected from a plurality of DL OFDM symbols for transmitting a DL OFDM control channel. The DL OFDM control channel can be a PDCCH or any other DL OFDM control channel. The at least one DL OFDM symbol can be selected from a plurality of DL OFDM symbols for transmitting a DL OFDM control channel in the slot. According to another possible implementation, the at least one DL OFDM symbol can be selected from one of a first DL OFDM symbol and a second OFDM DL symbol corresponding to the transmitted DL control channel. The first OFDM symbol can occur earlier in time than the second OFDM symbol.

At 1320, the DL OFDM control channel can be transmitted on the selected at least one DL OFDM symbol. According to a possible implementation, the DL control channel can be transmitted on the selected at least one DL OFDM symbol in a slot.

At 1330, data can be transmitted to a UE. At 1340, a HARQ-ACK can be received from the UE in a time-frequency resource. The HARQ-ACK can correspond to the transmitted data. The time-frequency resource can at least be based on the selected at least one DL OFDM symbol. According to a possible implementation, a HARQ-ACK can be received from the UE in a UL OFDM symbol in the slot, where the HARQ-ACK can correspond to the transmitted data, and where the UL OFDM symbol can be at least based on the selected at least one DL OFDM symbol. According to another possible implementation, a HARQ-ACK can be received from the UE in a UL OFDM symbol in a subsequent slot, where the HARQ-ACK can correspond to the transmitted data, and where the subsequent slot can be at least based on the selected at least one DL OFDM symbol.

According to another possible implementation, the HARQ-ACK can be received in a first time-frequency resource if the selected DL OFDM symbol is the first DL OFDM symbol and the HARQ-ACK can be received in a second time-frequency resource if the selected DL OFDM symbol is the second DL OFDM symbol. The first time-frequency resource can occur earlier in time than the second time-frequency resource. The first time-frequency resource can be within a first UL symbol in a slot and the second time-frequency resource can be within a second UL symbol in the slot, where the first UL symbol can occur before the second UL symbol. The first time-frequency resource can also be within a first slot and the second time-frequency resource can also be within a second slot, where the first slot can occur before the second slot. The DL OFDM control channel can include a DL resource assignment and a RB index for transmitting data in the DL resource assignment can be selected. According to a possible implementation, the HARQ-ACK can be received in a time-frequency resource based on the selected RB index. The HARQ-ACK from the UE can then be received in a time-frequency resource, where the HARQ-ACK can correspond to the transmitted data, and where the time-frequency resource can at least be based on the selected at least one DL OFDM symbol. According to another possible implementation, a CCE index corresponding to the DL control channel candidate can be selected and the HARQ-ACK can be received in a time-frequency resource based on the determined CCE index.

According to a related embodiment each control channel candidate can be mapped to REs within multiple OFDM symbols. According to a possible implementation, the DL control channel can include one of a plurality of DL control channels, where each DL control channel can be mapped to REs within multiple OFDM symbols. Then, a last DL OFDM symbol of the plurality of OFDM symbols corresponding to the DL control channel can be used for determination of a time-frequency resource for the HARQ-ACK, where the HARQ-ACK can correspond to the transmitted data. According to another possible implementation, data can be transmitted in a resource assigned by a DL resource assignment in the DL OFDM control channel. Then, the HARQ-ACK can be received in the determined time-frequency resource in response to transmitting data in the resource assigned by the DL resource assignment.

Figure 14:
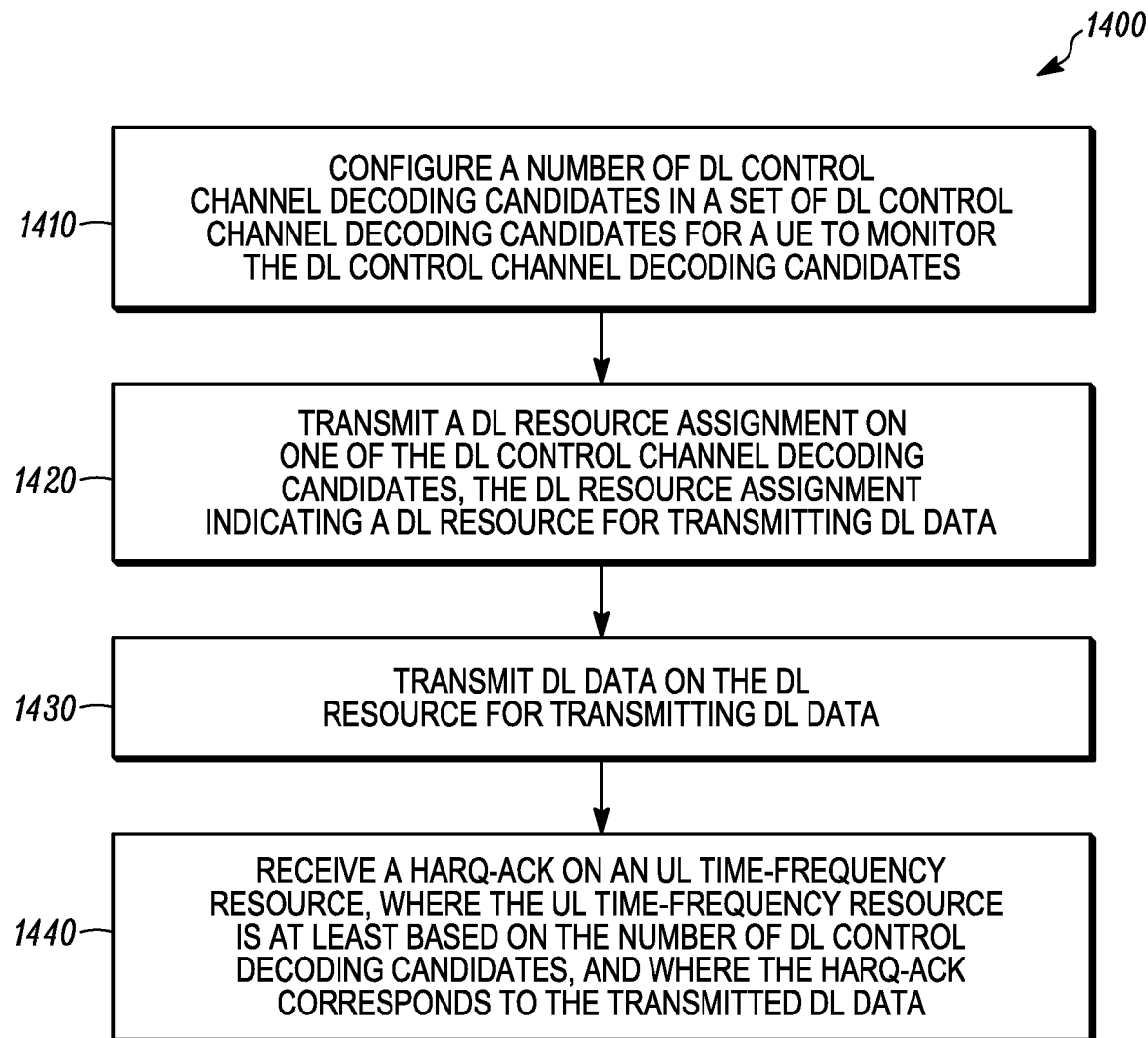
FIG. 14 is an example flowchart illustrating the operation of a wireless communication device according to a possible embodiment.

FIG. 14 is an example flowchart 1400 illustrating the operation of a wireless communication device, such as a network entity, according to a possible embodiment. As in other embodiments, the network entity can be a base station, an access point, a network controller, a mobility management entity, or any other network entity or combination of network entities that transmit scheduling information over a wireless wide area network.

At 1410, a number of DL control channel decoding candidates in a set of DL control channel decoding candidates can be configured for a UE to monitor the DL control channel decoding candidates. The number of DL control channel decoding candidates can be the actual number of the candidates. According to a possible implementation, the number of DL candidates can be configured to be a first number of DL control channel candidates or a second number of DL control channel candidates, where first number can be smaller than the second number. An indication of the number of DL control candidates can be transmitted, such as to a UE. The indication can be transmitted on a layer higher than a physical layer. The number of control channel decoding candidates in the set of DL control channel candidates can also be transmitted within a slot.

At 1420, a DL resource assignment can be transmitted on one of the DL control channel decoding candidates, the DL resource assignment indicating a DL resource for transmitting DL data. At 1430, DL data can be transmitted on the DL resource for transmitting DL data.

At 1440, a HARQ-ACK can be received on an UL time-frequency resource. The UL time-frequency resource can at least be based on the number of DL control decoding candidates. The HARQ-ACK can correspond to the transmitted DL data. According to a possible implementation, the HARQ-ACK can be received in a first time-frequency resource based on the determined number of DL control channel candidates being the first number of DL control channel candidates and the HARQ-ACK can be received in a second time-frequency resource based on the determined number of DL control channel candidates being the second number of DL control channel candidates. The first time-frequency resource can occur earlier in time than the second time-frequency resource. The first time-frequency resource can be a first OFDM symbol and the second time-frequency resource can be a second OFDM symbol. Also, the first time-frequency resource can be a first slot and the second time-frequency resource can be a second slot.

Figure 15:
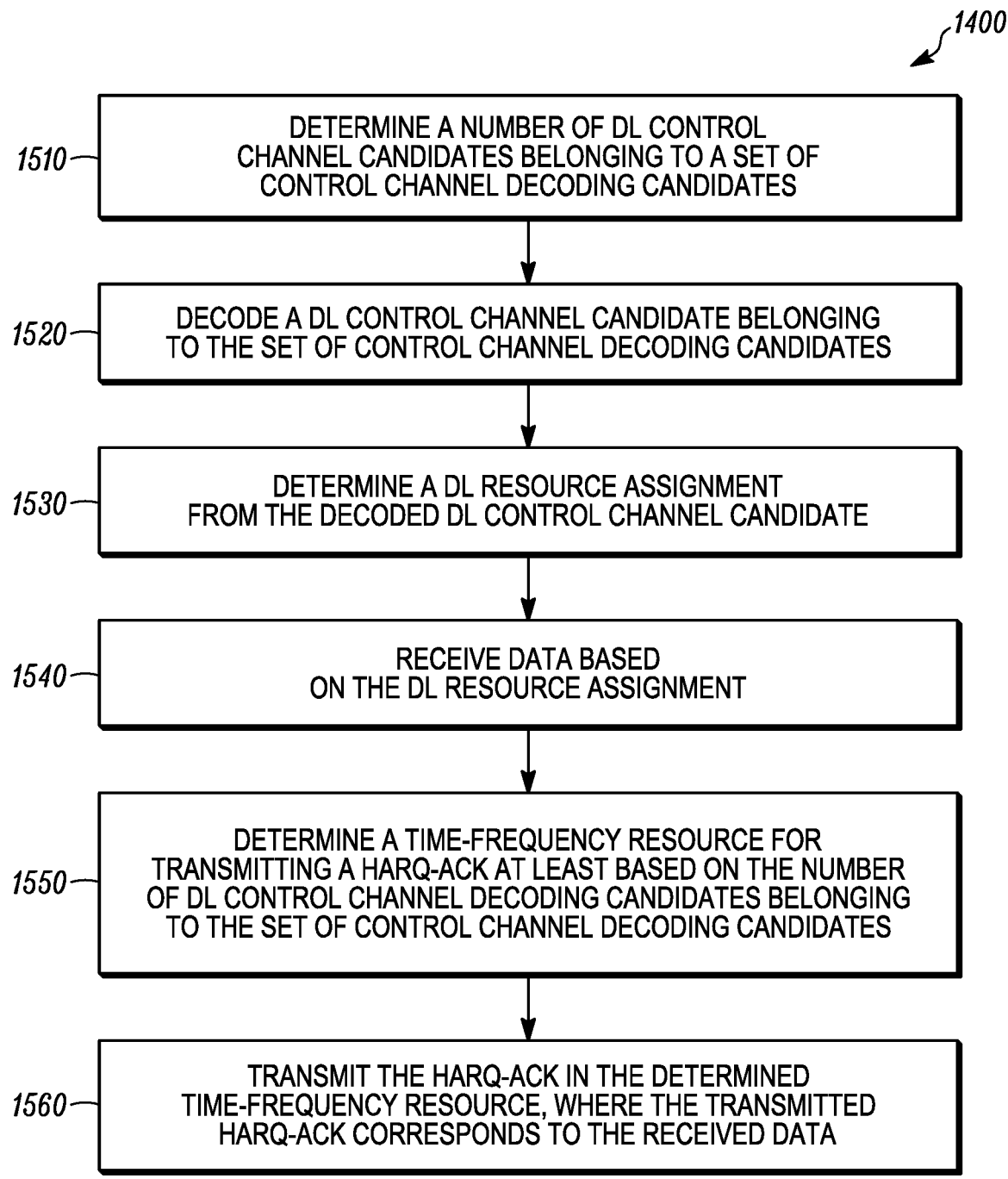
FIG. 15 is an example flowchart illustrating the operation of a wireless communication device according to a possible embodiment.

FIG. 15 is an example flowchart 1500 illustrating the operation of a wireless communication device, such as the UE 110 or any other terminal that transmits and receives wireless communication signals over a wireless wide area network, according to a possible embodiment. At step 1510, a number of DL control channel candidates belonging to a set of control channel decoding candidates can be determined. The number of DL can be determined to be a first number of DL control channel candidates or a second number of DL control channel candidates, where the first number can be smaller than the second number. An indication of the number of DL control candidates can be received. The indication can be received on a layer higher than a physical layer. Also, the number of control channel decoding candidates can be monitored in the set of DL control channel candidates within a slot.

At 1520, a DL control channel candidate belonging to the set of control channel decoding candidates can be decoded. At 1530, a DL resource assignment can be determined from the decoded DL control channel candidate. At 1540, data can be received based on the DL resource assignment. At 1550, a time-frequency resource for transmitting a HARQ-ACK can be determined at least based on the number of DL control channel decoding candidates belonging to the set of control channel decoding candidates.

At 1560, the HARQ-ACK can be transmitted in the determined time-frequency resource. The transmitted HARQ-ACK can correspond to the received data. The HARQ-ACK can be transmitted in a first time-frequency resource based on the determined number of DL control channel candidates being the first number of DL control channel candidates. Also, the HARQ-ACK can be transmitted in a second time-frequency resource based on the determined number of DL control channel candidates being the second number of DL control channel candidates. The first time-frequency resource can occur earlier in time than the second time-frequency resource. The first time-frequency resource can be a first OFDM symbol and the second time-frequency resource can be a second OFDM symbol. Also, the first time-frequency resource can be a first slot and the second time-frequency resource can be a second slot.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

FIG. 16 is an example block diagram of an apparatus 1600, such as a wireless communication device that can be a wireless terminal, can be a UE, can be a network entity, such as a base station, or can be any other wireless communication device, according to a possible embodiment. The apparatus 1600 can include a housing 1610, a controller 1620 within the housing 1610, audio input and output circuitry 1630 coupled to the controller 1620, a display 1640 coupled to the controller 1620, a transceiver 1650 coupled to the controller 1620, an antenna 1655 coupled to the transceiver 1650, a user interface 1660 coupled to the controller 1620, a memory 1670 coupled to the controller 1620, and a network interface 1680 coupled to the controller 1620. The apparatus 1600 can perform the methods described in all the embodiments.

The display 1640 can be a viewfinder, a liquid crystal display (LCD), a light emitting diode (LED) display, a plasma display, a projection display, a touch screen, or any other device that displays information. The transceiver 1650 can include a transmitter and/or a receiver. The audio input and output circuitry 1630 can include a microphone, a speaker, a transducer, or any other audio input and output circuitry. The user interface 1660 can include a keypad, a keyboard, buttons, a touch pad, a joystick, a touch screen display, another additional display, or any other device useful for providing an interface between a user and an electronic device. The network interface 1680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1670 can include a random access memory, a read only memory, an optical memory, a solid state memory, a flash memory, a removable memory, a hard drive, a cache, or any other memory that can be coupled to an apparatus.

The apparatus 1600 or the controller 1620 may implement any operating system, such as Microsoft Windows®, UNIX®, or LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1670 or elsewhere on the apparatus 1600. The apparatus 1600 or the controller 1620 may also use hardware to implement disclosed operations. For example, the controller 1620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1620 may be any controller or processor device or devices capable of operating an apparatus and implementing the disclosed embodiments. Some or all of the additional elements of the apparatus 1600 can also perform some or all of the operations of the disclosed embodiments.

According to a possible embodiment where the apparatus 1600 is a network entity, the transceiver 1650 can transmit scheduling information to a UE regarding a DL data channel in a slot. The scheduling information can include information regarding at least a set of allocated subcarriers. The DL data channel can require the UE to send an immediate HARQ-ACK feedback within the slot.

The transceiver 1650 can also transmit DL data by using every x-th subcarrier among the allocated subcarriers in the last symbol of the DL data channel A UE can receive only a first part of time-domain samples out of x of repeated samples in the last symbol of the DL data channel. The controller 1620 can set the value of x based on UE processing capability. The transceiver 1650 can indicate the value of x to the UE.

According to a possible embodiment where the apparatus 1600 is a UE, the transceiver 1650 can receive scheduling information from a network entity. The scheduling information can pertain to a DL data channel in a slot. The scheduling information can include information regarding at least a set of allocated subcarriers and the DL data channel can require the UE to send an immediate HARQ-ACK feedback within the slot. The transceiver 1650 can receive DL data by using every x-th subcarrier among the allocated subcarriers in the last symbol of the DL data channel. The controller 1620 can process the DL data. The transceiver 1650 may receive only a first part of time-domain samples out of x repeated samples in the last symbol of the DL data channel. The transceiver 1650 can transmit a HARQ-ACK in response to receiving the DL data.

According to a possible embodiment, where the apparatus 1600 is a UE, the transceiver 1650 can receive scheduling information to transmit a first physical uplink channel within a slot, where the slot can include a plurality of symbols. The slot can include the first physical uplink channel and a second physical uplink channel. The first physical uplink channel can be shorter in duration than the second physical uplink channel.

The controller 1620 can determine one or more allocated RBs for the first physical uplink channel based on a sub-band group and one or more RBGs within the sub-band group. The sub-band group can include one or more sub-bands, each sub-band can include one or more RBGs, each RBG can include one or more RBs, and a RB can include one or more contiguous REs in the frequency domain. The one or more sub-bands in the sub-band group can be distributed over the apparatus's configured operating BW. The apparatus's configured operating BW can include at least one sub-band group. A system BW including the apparatus's configured operating BW can include at least one sub-band group. The transceiver 1650 can transmit the first physical uplink channel in the determined one or more allocated RBs in the slot.

According to a possible implementation, a slot can include a first PUCCH and a second PUCCH, where the first PUCCH can be shorter in duration than the second PUCCH. The first physical uplink channel can be the first PUCCH. The first PUCCH can have one of the following short PUCCH formats based on UCI type and sizes:

Format 1: SR,
Format 1a: 1-bit HARQ-ACK,
Format 1b: 2-bit HARQ-ACK, or
Format 2: combination of CSI and HARQ-ACK.

According to a possible embodiment where the apparatus 1600 is a UE, the controller 1620 can decode a DL control channel candidate. The controller 1620 can decode the DL control channel candidate in a slot. The controller 1620 can determine which DL OFDM symbol the decoded DL control channel candidate is received in. For example, the controller 1620 can determine the DL OFDM symbol in the slot in which the DL control channel candidate is decoded. The controller 1620 can determine a DL resource assignment from the decoded DL control channel candidate.

The transceiver 1650 can receive data based on the DL resource assignment. The controller 1620 can determine a time-frequency resource for transmitting a HARQ-ACK at least based on the determined DL OFDM symbol. The UL OFDM symbol in the slot for transmitting HARQ-ACK can be determined at least based on the determined DL OFDM symbol. The time-frequency resource for transmitting HARQ-ACK can be determined to be a subsequent slot for transmitting HARQ-ACK at least based on the determined DL OFDM symbol. The transceiver 1650 can transmit the HARQ-ACK in the determined time-frequency resource, where the transmitted HARQ-ACK can correspond to the received data. The HARQ-ACK can be transmitted in the determined UL OFDM symbol. The HARQ-ACK can also be transmitted in the determined subsequent slot.

According to a possible implementation, determining a DL OFDM symbol the decoded DL control candidate is received in can be based on determining the DL OFDM symbol from one of a first DL OFDM symbol and a second OFDM DL symbol corresponding to the decoded DL control channel candidate. The first OFDM symbol can occur earlier in time than the second OFDM symbol. The transceiver 1650 can transmit the HARQ-ACK in a first time-frequency resource if the determined DL OFDM symbol is the first DL OFDM symbol. The transceiver 1650 can transmit the HARQ-ACK in a second time-frequency resource if the determined DL OFDM symbol is the second DL OFDM symbol. The first time-frequency resource can occur earlier in time than the second time-frequency resource. The first time-frequency resource can be within a first UL symbol in a slot and the second time-frequency resource can be within a second UL symbol in the slot, where the first UL symbol can occur before the second UL symbol. The first time-frequency resource can also be within a first slot and the second time-frequency resource can be within a second slot, where the first slot can occur before the second slot.

The controller 1620 can determine a RB index for receiving data from the DL resource assignment. The determined time-frequency resource for transmitting HARQ-ACK can be based on determining the time-frequency resource for transmitting HARQ-ACK based on the determined RB index. The controller 1620 can determine a CCE index corresponding to the DL control channel candidate. The determined time-frequency resource for transmitting HARQ-ACK can be based on determining the time-frequency resource for transmitting HARQ-ACK based on the determined CCE index.

According to another possible implementation, each control channel candidate can be mapped to REs within multiple OFDM symbols. The DL control channel candidate can be one of a plurality of DL control channel candidates, where each DL control channel candidate can be mapped to REs within multiple OFDM symbols. Determining a DL OFDM symbol can be based on determining a last DL OFDM symbol of multiple OFDM symbols corresponding to the decoded DL control channel candidate.

Data can be received by the transceiver 1650 in a resource assigned by the DL resource assignment. Then the HARQ-ACK can be transmitted by the transceiver 1650 in the determined time-frequency resource in response to receiving the data based on the DL resource assignment.

According to a possible embodiment where the apparatus 1600 is a UE, the controller 1620 can monitor the number of control channel decoding candidates in the set of DL control channel candidates within a slot. The controller 1620 can determine a number of DL control channel candidates belonging to a set of control channel decoding candidates. The number of DL control channel candidates can be determined to be a first number of DL control channel candidates or a second number of DL control channel candidates, where the first number can be smaller than the second number. The controller 1620 can decode a DL control channel candidate belonging to the set of control channel decoding candidates. The controller 1620 can determine a DL resource assignment from the decoded DL control channel candidate.

The transceiver 1650 can receive data based on the DL resource assignment. In response to receiving the data, the controller 1620 can determine a time-frequency resource for transmitting a HARQ-ACK at least based on the number of DL control channel decoding candidates belonging to the set of control channel decoding candidates. The transceiver 1650 can transmit the HARQ-ACK in the determined time-frequency resource, where the transmitted HARQ-ACK can correspond to the received data. The HARQ-ACK can be transmitted in a first time-frequency resource based on the determined number of DL control channel candidates being the first number. The HARQ-ACK can be transmitted in a second time-frequency resource based on the determined number of DL control channel candidates being the second number. The first time-frequency resource can occur earlier in time than the second time-frequency resource.

According to a possible embodiment, where the apparatus 1600 is a network entity, the controller 1620 can configure a number of DL control channel decoding candidates in a set of DL control channel decoding candidates for a UE to monitor the DL control channel decoding candidates. Configuring a number of DL control channel candidates can include configuring the number to be a first number of DL control channel candidates or a second number of DL control channel candidates, where the first number can be smaller than the second number. The transceiver 1650 can transmit an indication of the number of DL control candidates, such as to a UE.

The transceiver 1650 can transmit a DL resource assignment on one of the DL control channel decoding candidates, such as to a UE. The DL resource assignment can indicate a DL resource for transmitting DL data. The transceiver 1650 can transmit DL data on the DL resource for transmitting DL data, such as to a UE. The transceiver 1650 can receive a HARQ-ACK on an UL time-frequency resource. The UL time-frequency resource can at least be based on the number of DL control decoding candidates. The HARQ-ACK can correspond to the transmitted DL data. The transceiver 1650 can receive the HARQ-ACK in a first time-frequency resource based on the determined number of DL control channel candidates being the first number. The transceiver 1650 can receive the HARQ-ACK in a second time-frequency resource based on the determined number of DL control channel candidates being the second number. The first time-frequency resource can occur earlier in time than the second time-frequency resource.

The methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:
1. A method comprising:
    receiving scheduling information to transmit a first physical uplink channel within a slot, where the slot includes a plurality of symbols,
        wherein the slot includes the first physical uplink channel and a second physical uplink channel, and
        wherein the first physical uplink channel is shorter in duration than the second physical uplink channel;
    determining one or more allocated resource blocks for the first physical uplink channel based on a sub-band group and one or more resource block groups within the sub-band group,
        wherein the sub-band group includes one or more sub-bands, each sub-band comprises one or more resource block groups, each resource block group comprises one or more resource blocks, and a resource block includes one or more contiguous resource elements in the frequency domain; and
    transmitting the first physical uplink channel in the determined one or more allocated resource blocks in the slot,
    wherein the scheduling information indicates the sub-band group and the one or more resource block groups within the sub-band group.

2. The method according to claim 1, wherein the first physical uplink channel comprises a physical uplink control channel that spans up to two symbols of the slot.

3. The method according to claim 2, further comprising:
    decoding a downlink control channel candidate;
    determining which downlink orthogonal frequency division multiplexing symbol the decoded downlink control channel candidate is received in;
    determining a downlink resource assignment from the decoded downlink control channel candidate;
    receiving data based on the downlink resource assignment;
    determining a time-frequency resource in the determined one or more allocated resource blocks for the physical uplink control channel carrying a hybrid automatic repeat request acknowledgement at least based on the determined downlink orthogonal frequency division multiplexing symbol; and
    transmitting the hybrid automatic repeat request acknowledgement in the determined time-frequency resource in the determined one or more allocated resource blocks for the physical uplink control channel, where the transmitted hybrid automatic repeat request acknowledgement corresponds to the received data.

4. The method according to claim 3,
wherein the downlink control channel candidate comprises one of a plurality of downlink control channel candidates, where each downlink control channel candidate can be mapped to resource elements within multiple orthogonal frequency division multiplexing symbols, and
wherein determining a downlink orthogonal frequency division multiplexing symbol comprises determining a last downlink orthogonal frequency division multiplexing symbol of multiple orthogonal frequency division multiplexing symbols corresponding to the decoded downlink control channel candidate.

5. The method according to claim 3, wherein the method further comprises:
determining a number of downlink control channel candidates belonging to a set of control channel decoding candidates;
determining the time-frequency resource in the determined one or more allocated resource blocks for the physical uplink control channel carrying the hybrid automatic repeat request acknowledgement at least based on the number of downlink control channel decoding candidates belonging to the set of control channel decoding candidates.

6. The method according to claim 1,
wherein the first physical uplink channel is transmitted with an orthogonal frequency division multiplexing waveform, and
wherein the method further comprises frequency-division multiplexing a demodulation reference signal with at least one selected from uplink data and uplink control information in the first physical uplink channel.

7. The method according to claim 1,
wherein the one or more sub-bands in the sub-band group are distributed over a user equipment's configured operating bandwidth,
wherein the user equipment's configured operating bandwidth includes at least one sub-band group, and
wherein a system bandwidth including the user equipment's configured operating bandwidth includes at least one sub-band group.

8. The method according to claim 7,
wherein the user equipment's configured operating bandwidth comprises a plurality of sub-band groups including the sub-band group, where the sub-band group includes a plurality of sub-bands,
wherein the method further comprises frequency-hopping of the sub-band group in different slots, and
wherein frequency-hopping comprises changing the frequency location of the plurality of sub-bands of the sub-band group in subsequent slots.

9. The method according to claim 1,
wherein resource allocation for the first physical uplink channel allows a set of resource block group aggregation levels, and
wherein the set of resource block group aggregation levels includes 1, 2, 4, and 8 resource block group's.

10. The method according to claim 1,
wherein the scheduling information includes a sub-band group index and a resource block group bitmap, and
wherein each bit in the resource block group bitmap corresponds to each resource block group within the indicated sub-band group and indicates a resource assignment of the corresponding resource block group.

11. The method according to claim 1, further comprising transmitting multiple short physical uplink control channels carrying different uplink control information simultaneously.

12. The method according to claim 1,
wherein a slot includes a first physical uplink control channel and a second physical uplink control channel, where the first physical uplink control channel is shorter in duration than the second physical uplink control channel,
wherein the first physical uplink channel comprises the first physical uplink control channel, and
wherein the first physical uplink control channel has one selected at least from the following short physical uplink control channel formats based on uplink control information type and sizes:
Format 1: scheduling request,
Format 1a: 1-bit hybrid automatic repeat request acknowledgement,
Format 1b: 2-bits hybrid automatic repeat request acknowledgement, and
Format 2: combination of channel state information and hybrid automatic repeat request acknowledgement bits.

13. The method according to claim 12, wherein a sequence-based message is used for scheduling request, 1-bit hybrid automatic repeat request acknowledgement, and 2-bit hybrid automatic repeat request acknowledgement transmitted on the first physical uplink channel.

14. The method according to claim 13, further comprising using a base sequence and sequences resulting from time-domain cyclic shifts of the base sequence for demodulation reference signal and sequence-based messages.

15. The method according to claim 13, wherein a resource block-length sequence used for scheduling request, 1-bit hybrid automatic repeat request acknowledgement, and 2-bit hybrid automatic repeat request acknowledgement, is mapped to every resource element of an allocated resource block.

16. The method according to claim 13, wherein a sequence used for the scheduling request, the 1-bit hybrid automatic repeat request acknowledgement, and the 2-bit hybrid automatic repeat request acknowledgement is transmitted on resource elements reserved for demodulation reference signal in at least one selected from an allocated resource block group and an allocated resource block.

17. The method according to claim 16,
wherein the slot includes a first physical uplink control channel and a second physical uplink control channel,
wherein the first physical uplink control channel is shorter in duration than the second physical uplink control channel,
wherein the slot also includes a first physical uplink shared channel and a second physical uplink shared channel,
wherein the first physical uplink shared channel is shorter in duration than the second physical uplink shared channel,
wherein the first physical uplink channel can be at least one selected from the first physical uplink control channel and the first physical uplink shared channel, and
wherein the method further comprises transmitting the first physical uplink control channel and the first physical uplink shared channel together in at least one allocated resource blocks, wherein the first physical uplink control channel comprises the sequence used for the scheduling request, the 1-bit hybrid automatic repeat request acknowledgement, and the 2-bit hybrid automatic repeat request acknowledgement.

18. The method according to claim 13, further comprising transmitting the first physical uplink channel with 2-bits hybrid automatic repeat request acknowledgement that is indicated based on selection of one selected from two mutually exclusive subsets of allocated resource blocks, and based on selection of one selected from two allocated sequences.

19. An apparatus comprising:
a transceiver that receives scheduling information to transmit a first physical uplink channel within a slot, where the slot includes a plurality of symbols,
wherein the slot includes the first physical uplink channel and a second physical uplink channel, and
wherein the first physical uplink channel is shorter in duration than the second physical uplink channel; and
a controller coupled to the transceiver, where the controller determines one or more allocated resource blocks for the first physical uplink channel based on a sub-band group and one or more resource block groups within the sub-band group,
wherein the sub-band group includes one or more sub-bands, each sub-band comprises one or more resource block groups, each resource block group comprises one or more resource blocks, and a resource block includes one or more contiguous resource elements in the frequency domain, and
wherein the transceiver transmits the first physical uplink channel in the determined one or more allocated resource blocks in the slot,
wherein the scheduling information indicates the sub-band group and the one or more resource block groups within the sub-band group.

20. The apparatus according to claim 19,
wherein the one or more sub-bands in the sub-band group are distributed over the apparatus's configured operating bandwidth,
wherein the apparatus's configured operating bandwidth includes at least one sub-band group, and
wherein a system bandwidth including the apparatus's configured operating bandwidth includes at least one sub-band group.

21. The apparatus according to claim 19,
wherein a slot includes a first physical uplink control channel and a second physical uplink control channel, where the first physical uplink control channel is shorter in duration than the second physical uplink control channel,
wherein the first physical uplink channel comprises the first physical uplink control channel, and
wherein the first physical uplink control channel has one selected at least from the following short physical uplink control channel formats based on uplink control information type and sizes:
Format 1: scheduling request,
Format 1a: 1-bit hybrid automatic repeat request acknowledgement,
Format 1b: 2-bits hybrid automatic repeat request acknowledgement, and
Format 2: combination of channel state information and hybrid automatic repeat request acknowledgement.

22. The method according to claim 1,
wherein receiving comprises receiving, at a user equipment, the scheduling information,
wherein determining comprises determining, by the user equipment, the one or more allocated resource blocks,
wherein transmitting comprises transmitting, by the user equipment, the first physical uplink channel, and
where a bandwidth comprises a plurality of sub-band groups, where the sub-band group comprises one of the plurality of sub-band groups.

23. The apparatus according to claim 19, where a bandwidth comprises a plurality of sub-band groups, where the sub-band group comprises one of the plurality of sub-band groups.

24. The apparatus according to claim 20,
wherein the apparatus's configured operating bandwidth comprises a plurality of sub-band groups including the sub-band group, where the sub-band group includes a plurality of sub-bands,
wherein the controller frequency-hops the sub-band group in different slots, and
wherein frequency-hopping comprises changing the frequency location of the plurality of sub-bands of the sub-band group in subsequent slots.

* * * * *